(12) United States Patent
Andrew

(10) Patent No.: US 7,072,517 B2
(45) Date of Patent: Jul. 4, 2006

(54) INVERSE DISCRETE WAVELET TRANSFORMS FOR DATA DECOMPRESSION

(75) Inventor: James Philip Andrew, Waverton (AU)

(73) Assignee: Canon Kabushiki Kaisha, Tokyo (JP)

(*) Notice: Subject to any disclaimer, the term of this patent is extended or adjusted under 35 U.S.C. 154(b) by 691 days.

(21) Appl. No.: 10/201,684

(22) Filed: Jul. 24, 2002

(65) Prior Publication Data
US 2003/0031370 A1 Feb. 13, 2003

(30) Foreign Application Priority Data
Jul. 26, 2001 (AU) ................................ PR6626

(51) Int. Cl.
G06K 9/36 (2006.01)
G06K 9/46 (2006.01)

(52) U.S. Cl. ......................... 382/233; 240/248
(58) Field of Classification Search .......... 382/233, 382/240, 248; 375/240.19, 240.25
See application file for complete search history.

(56) References Cited

U.S. PATENT DOCUMENTS

| 6,246,798 | B1 | 6/2001 | Andrew et al. | 382/240 |
|---|---|---|---|---|
| 6,259,819 | B1 | 7/2001 | Andrew et al. | 382/248 |
| 6,263,110 | B1 | 7/2001 | Andrew et al. | 382/232 |
| 6,266,414 | B1 | 7/2001 | Bradley et al. | 380/240 |
| 6,351,568 | B1 | 2/2002 | Andrew | 382/239 |
| 6,389,074 | B1 | 5/2002 | Andrew | 375/240.05 |
| 6,466,698 | B1 * | 10/2002 | Creusere | 382/240 |
| 6,847,735 | B1 * | 1/2005 | Kajiwara et al. | 382/233 |

FOREIGN PATENT DOCUMENTS

AU 744914 1/2001

* cited by examiner

Primary Examiner—Phuoc Tran
(74) Attorney, Agent, or Firm—Fitzpatrick, Cella, Harper & Scinto

(57) ABSTRACT

A method inverse discrete wavelet transforms subband data in segments and maintains a state between segments. The method selects one of a plurality of different computational procedures for performing the inverse DWT by testing the state and the subset of the current segment of subband data to determine if a current segment can be inverse transformed with a reduced computation procedure. If the test is positive the method performs the inverse DWT using the reduced computation procedure; otherwise the method performs the inverse DWT of the segment using another procedure.

46 Claims, 8 Drawing Sheets

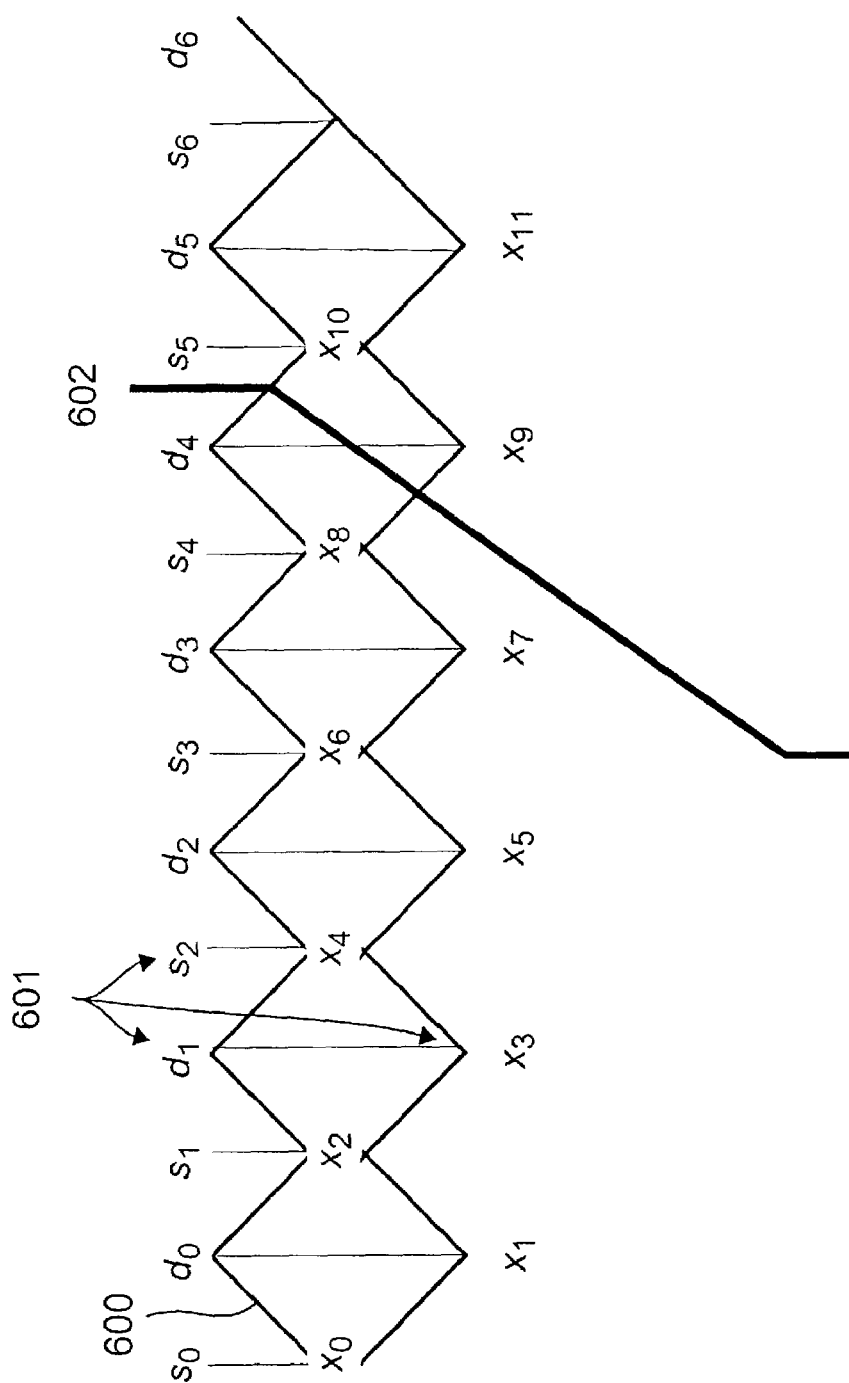

INVERSE DISCRETE WAVELET TRANSFORMS FOR DATA DECOMPRESSION

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates generally to data compression and, in particular, to image decompression. The present invention relates to a method and apparatus for the inverse discrete wavelet transforming of compressed image data. The invention also relates to a computer program for inverse discrete wavelet transforming of an image.

BACKGROUND

The field of digital data compression and in particular digital image compression has attracted a great interest for some time. Recently, compression schemes based on a Discrete Wavelet Transform (DWT) have become increasingly popular because the DWT offers a non-redundant hierarchical decomposition of an image and resultant compression of the image provides favourable rate-distortion statistics.

Typically, the discrete wavelet transform (DWT) of an image is performed using a series of one-dimensional DWTs. A one-dimensional DWT of a signal (ie. an image row) is performed by lowpass and highpass filtering the signal, and decimating each filtered signal by 2. Decimation by 2 means that only every second sample of the filtering processes is calculated and retained. When performing a convolution (filtering) the filter is moved along by two samples at a time, instead of the usual one sample, to effect the decimation by 2. In this way, for a signal of N samples, there are N DWT samples, N/2 lowpass samples, and N/2 highpass samples. Strictly speaking this is a single level one dimensional DWT. However, since only single level one-dimensional DWTs are used in this description, they are referred to simply as a one-dimensional DWT (1D DWT).

FIG. 1 illustrates a typical process for performing a single level two-dimensional DWT of an input image 100. Each column of the image 100 is analysed with a one-dimensional DWT giving output columns whose first half comprise lowpass samples and whose second half comprise highpass samples. A single level one-dimensional DWT of a column is referred to as a column DWT. Such analysis of each column of the input image 100 results in a coded representation 101 having two sub-images labelled $L^c$ and $H^c$. The columns of $L^c$ are formed of the lowpass filtered (and decimated) columns of the input image 100 and the columns of $H^c$ are formed of the highpass filtered (and decimated) columns of the input image 100. The coded representation 101 may then be considered as an output image, the rows of which are then analysed with a one-dimensional DWT, or row DWT, as also illustrated in FIG. 1. This results in a further coded representation 102 having four sub-images or subbands, labelled LL, HL, LH and HH, where L and H refer to lowpass and highpass respectively, and in the two letter label, the first letter corresponds to the row filter, while the second to the column filter. That is, the HL subband is the result of lowpass filtering the columns (and decimating by 2) and highpass filtering the resulting rows (and decimating by 2). The LL subband is also called the DC or low frequency subband while the HL, LH and HH are called AC or high frequency subbands. Depending on the context, a single level two-dimensional DWT 102 of an image 100 can be referred to as a single level DWT (or even simply DWT) of the image 100.

Each one-dimensional DWT can be inverted. That is, having analysed a one-dimensional signal of N samples into N/2 lowpass and N/2 highpass subband samples, these subband samples, of which there are N in total, can be synthesized with a one-dimensional inverse DWT, into the N samples of the original one-dimensional signal. Thus, the original image can be reconstructed by synthesising the rows then the columns of a single level DWT of an image. This is also illustrated in FIG. 1. Thus a single level (two-dimensional) DWT is invertible. The process of a inverting a DWT is often referred to as synthesis or applying and an inverse DWT, or simply iDWT.

To obtain a two level DWT the LL subband is further analysed with a single level DWT into four subbands, just as the original image was analysed into four subbands. To obtain a three level DWT, the LL subband resulting from the two level DWT is again analysed. Such a process can be perfomed in similar fashion for an arbitrary number of levels. Thus a multi-level DWT or simply DWT of an image can be performed by iterating a single level DWT some finite number of times on subsequent LL subbands, where the first LL subband is the original image (e.g. 100). A multi-level DWT can be inverted by simply inverting each single level DWT.

At each level of a multi-level DWT there are three high frequency subbands, the HL, LH and HH subbands. Therefore, for a more precise notation a level number is included in the labelling of the subbands. Thus the four subbands illustrated in the coded representation 102 of FIG. 1 are more precisely denoted LL1, HL1, LH1 and HH1. Similarly the three high frequency subbands at level 2, resulting from the single level DWT of the LL1 subband, are denoted HL2, LH2 and HH2. Using this subband notation the original image 100 can be labelled as the LL0 subband.

In some image compression methods the subbands resulting from a DWT are tiled into blocks of samples, called code-blocks. For example, each block consists of, say, H rows by H columns. A row of blocks in a subband is formed of H lines of the subband. Typically, each block (code-block) is quantised and entropy coded substantially independently. Thus each block can be entropy decoded (and dequantized) independently. A block essentially becomes a minimum coded unit. The blocks are not necessarily strictly independently encoded. Some small amount of information, such as the most significant bit plane in each block, may be coded together for all blocks in a subband. However, if the time or effort required to encode or decode such information for one block is trivial when compared to encoding or decoding a whole block, then for present purposes it may be considered that the blocks are coded independently. Such image compression methods are referred to herein as block-based DWT image compression methods.

Other compression methods such as JPEG employ a block discrete cosine transform (DCT) to map data into a frequency domain. Typically an image is tiled in the spatial domain into 8×8 blocks of pixels. Each 8×8 block is transformed into a block of 8×8 coefficients, including 1 DC coefficient, and 63 AC coefficients. For baseline JPEG, the coefficients are quantized and coded into one entropy coded segment in the compressed image bit-stream. This segment then represents the original 8×8 block of pixels. Apart from a small coupling of the DC coefficients, there is a 1-1 relationship between the 8×8 blocks in the image domain and entropy coded segments.

For typical compression rates, many of the coefficients are quantized to zero and hence dequantized to zero. At the decoder, each block of 8×8 pixels is reconstructed substantially independently. Firstly the quantized DCT coefficients are decoded from the compressed bit-stream. The DC value is reconstructed from the current difference and the previous blocks DC value. The coefficients are then dequantized and inverse transformed with an inverse DCT. Many inverse (and forward) DCT techniques employ a series of one dimensional DCT's. Firstly all the columns are inverse transformed, and then all the rows. For each column a test may be made if each of the AC coefficients are zero. If so, a faster version of the inverse column DCT can be employed, providing a speed-up for the overall two-dimensional DCT. This technique is employed by the Independent JPEG Group (IJG) code which is widely used in JPEG compression and decompression software. A similar test can also be employed when performing the inverse row DCT's. However, if the row inverse DCT's are employed after the column inverse DCT's the likelihood of all the AC coefficients being zero is significantly less that for the column inverse DCT's. In some cases the overhead required to test each row can result in a slower overall inverse two-dimension DCT, which is contrary to the intended purpose.

The 1-1 mapping between 8×8 blocks of coefficients and 8×8 blocks of pixels facilitate using knowledge of the zero-valued coefficients to accelerate the inverse DCT. If a set of AC coefficients (ie a column) is zero, then it is known that all relevant AC coefficients that can effect this block are zero. That is there is no overlap from adjacent blocks, and AC coefficients in adjacent (or other) blocks have no effect on the pixels resulting from the inverse transform of the current block.

For block-based DWT image compression methods, decompression involves entropy decoding compressed blocks of subband samples, and then an inverse DWT is performed on the resulting subbands. As with the DCT, at typical compression rates (for example 1 bit per pixel), many of the high frequency subband coefficients are quantized to 0. A rough correspondence can be derived between a set of DWT coefficients and a set of the same size of image domain pixels. However, for overlapping filters, such as those employed by the JPEG2000 standard (ISO/IEC 15-1:2000), the image domain pixels actually depend on a greater number of DWT coefficients: namely some of those adjacent to the given set of DWT coefficients. This non 1:1 relationship between subband and image domain blocks means that identifying all corresponding AC subband blocks are zero is not sufficient to determine that the corresponding output block can be generated assuming zero AC subband values.

Further, the inverse DWT is usually performed one-level at a time. There are thus 3 AC coefficients for every DC coefficient, for each level of the inverse DWT. The smaller number of AC coefficients relative to the DC coefficients, and the greater amount of overlapping state means that the IJG approach referred to above to reduce computation (based on zero valued AC coefficients) cannot be simply adopted in an efficient manner to the case of an inverse DWT.

SUMMARY OF THE INVENTION

It is an object of the present invention to substantially overcome, or at least ameliorate, one or more disadvantages of existing arrangements.

In accordance with one aspect of the present invention, there is provided a method of inverse discrete wavelet transforming subband data in segments, wherein a plurality of different computational procedures for performing the inverse DWT may be used, and wherein a current state is maintained between a current and previous segments of subband data, the method comprising the steps of: testing said current state and a subset of the current segment of subband data to determine if the current segment can be inverse transformed with a reduced said computational procedure; if the test is positive performing the inverse DWT using said reduced computational procedure; otherwise performing the inverse DWT of said segment using another said computational procedure.

In accordance with another aspect of the present invention, there is provided a method of performing a two-dimensional inverse discrete wavelet transform on blocks of LL, LH, HL and HH subband coefficients, utilising a non-AC and AC lifting state between adjacent vertical and horizontal blocks, the method comprising the step of: generating a current output block of pixels corresponding to a current set of LL, HL, LH, and HH blocks, wherein if said HL, LH and HH blocks contain all zero valued coefficients, and said AC lifting state corresponding to said current block of pixels is zero, performing an inverse block-based DWT using the LL block and non-AC lifting state to generate said current block of pixels.

In accordance with another aspect of the present invention, there is provided a method of two-dimensional inverse discrete wavelet transforming subband data, wherein said subband data comprises a plurality of blocks of subband data and said blocks each comprising at least one quadruplet of LL, HL, LH and HH subband coefficients, and wherein the method utilises a non-AC and AC lifting state between adjacent vertical and horizontal blocks, the method comprising the step of: generating a current output block of pixels corresponding to a current set of LL, HL, LH, and HH blocks, wherein if said HL, LH and HH blocks contain all zero valued coefficients, and said AC lifting state corresponding to said current block of pixels is zero, performing an inverse block-based DWT using the LL block and a non-AC lifting state to generate said current block of pixels.

In accordance with another aspect of the present invention, there is provided apparatus for inverse discrete wavelet transforming subband data in segments, wherein a plurality of different computational procedures for performing the inverse DWT may be used, and wherein a current state is maintained between a current and previous segments of subband data, the apparatus comprising: means for testing said current state and a subset of the current segment of subband data to determine if the current segment can be inverse transformed with a reduced said computational procedure; means for performing, if the test is positive, the inverse DWT using said reduced computational procedure; and means for performing, if the test is negative, the inverse DWT of said segment using another said computational procedure.

In accordance with another aspect of the present invention, there is provided apparatus for performing a two-dimensional inverse discrete wavelet transform on blocks of LL, LH, HL and HH subband coefficients, utilising a non-AC and AC lifting state between adjacent vertical and horizontal blocks, the apparatus comprising: means for generating a current output block of pixels corresponding to a current set of LL, HL, LH, and HH blocks, wherein if said HL, LH and HH blocks contain all zero valued coefficients, and said AC lifting state corresponding to said current block of pixels is zero, performing an inverse block-based DWT using the LL block and non-AC lifting state to generate said current block of pixels.

In accordance with another aspect of the present invention, there is provided apparatus for two-dimensional inverse discrete wavelet transforming subband data, wherein said subband data comprises a plurality of blocks of subband data and said blocks each comprising at least one quadruplet of LL, HL, LH and HH subband coefficients, the apparatus utilising a non-AC and AC lifting state between adjacent vertical and horizontal blocks, the apparatus comprising: means for generating a current output block of pixels corresponding to a current set of LL, HL, LH, and HH blocks, wherein if said HL, LH and HH blocks contain all zero valued coefficients, and said AC lifting state corresponding to said current block of pixels is zero, performing an inverse block-based DWT using the LL block and a non-AC lifting state to generate said current block of pixels.

In accordance with another aspect of the present invention, there is provided computer program for inverse discrete wavelet transforming subband data in segments, wherein a plurality of different computational procedures for performing the inverse DWT may be used, and wherein a current state is maintained between a current and previous segments of subband data, the computer program comprising: means for testing said current state and a subset of the current segment of subband data to determine if the current segment can be inverse transformed with a reduced said computational procedure; means for performing, if the test is positive, the inverse DWT using said reduced computational procedure; and means for performing, if the test is negative, the inverse DWT of said segment using another said computational procedure.

In accordance with another aspect of the present invention, there is provided a computer program for performing a two-dimensional inverse discrete wavelet transform on blocks of LL, LH, HL and HH subband coefficients, utilising a non-AC and AC lifting state between adjacent vertical and horizontal blocks, the computer program comprising: means for generating a current output block of pixels corresponding to a current set of LL, HL, LH, and HH blocks, wherein if said HL, LH and HH blocks contain all zero valued coefficients, and said AC lifting state corresponding to said current block of pixels is zero, performing an inverse block-based DWT using the LL block and non-AC lifting state to generate said current block of pixels.

In accordance with another aspect of the present invention, there is provided a computer program for two-dimensional inverse discrete wavelet transforming subband data, wherein said subband data comprises a plurality of blocks of subband data and said blocks each comprising at least one quadruplet of LL, HL, LH and HH subband coefficients, the apparatus utilising a non-AC and AC lifting state between adjacent vertical and horizontal blocks, the computer program comprising: means for generating a current output block of pixels corresponding to a current set of LL, HL, LH, and HH blocks, wherein if said HL, LH and HH blocks contain all zero valued coefficients, and said AC lifting state corresponding to said current block of pixels is zero, performing an inverse block-based DWT using the LL block and a non-AC lifting state to generate said current block of pixels.

BRIEF DESCRIPTION OF THE DRAWINGS

A preferred implementation of the present invention will now be described with reference to the drawings and appendix, in which:

FIG. 6 is a lifting lattice of an inverse DWT 5/3 filter for use in the preferred decoding method;

DETAILED DESCRIPTION

Figure 1:
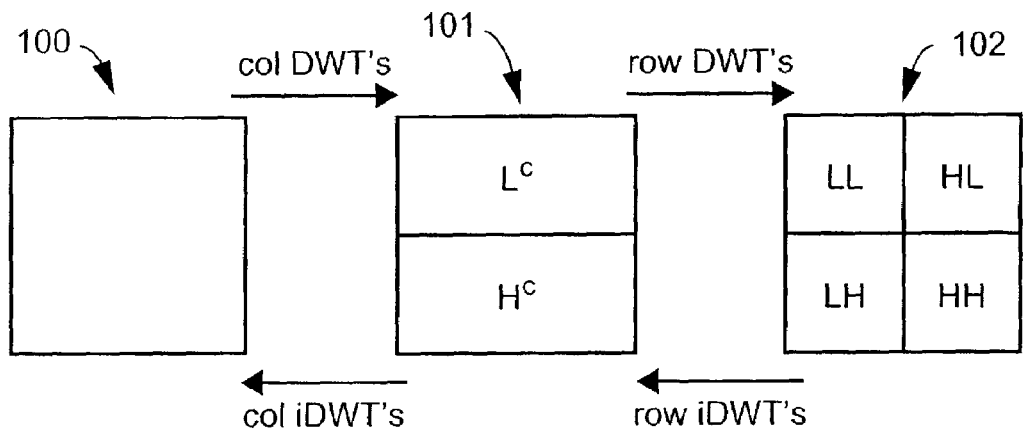
FIG. 1 illustrates a prior art process of performing a single level two-dimensional discrete wavelet transform of an image.

Where reference is made in any one or more of the accompanying drawings to steps and/or features, which have the same reference numerals, those steps and/or features have for the purposes of this description the same function(s) or operation(s), unless the contrary intention appears.

The principles of the preferred method, apparatus and computer program described herein have general applicability to data compression. However, for ease of explanation, the preferred method, apparatus and computer program are described with reference to digital still image compression. However, it is not intended that the present invention be limited to the described apparatus and method. For example, the invention may have application to digital video decompression.

Throughout the specification a reference to the term image is to be construed, unless otherwise stated, as an image in the spatial domain or its equivalent in the frequency domain depending upon the context in which the term image is used. Where an ambiguity may arise the terms "original image" shall be used as the spatial domain image and "DWT image" as the corresponding frequency domain image. Similarly, a reference to "sub-image" shall be taken to mean a portion or part of an image.

Apart from precision effects, the order in which the rows and columns of pixels are transformed or inverse transformed does not usually effect the result of the DWT or iDWT of an image. The description given herein describes for the purposes of clarity that the columns are transformed first and then the rows for the forward DWT, and that the rows are inverse transformed first, followed by the columns for the inverse DWT. However, the invention is not limited as such and can include that the rows are transformed first and then the columns for the forward DWT, and that the columns are inverse transformed first, followed by the rows for the inverse DWT. Accordingly throughout the present description and appended claims, a reference to a "row" and a "column" can alternatively be taken to include a reference to a "column" and a "row" respectively.

Block Based Entropy Coding of DWT Subband Image Data

When entropy coding, it is typically most efficient and convenient to fully entropy code a whole block of subband data. Similarly, when entropy decoding it is convenient and efficient to entropy decode a whole block of data. Generally, a whole block of data is held in a local memory during encoding or decoding, so that a processor performing the decoding requires minimal interaction with external memory, while executing these processes. The decoding method according to the preferred implementation performs the iDWT at a block level.

Correspondence Between the Subband and Image Domain

Figure 2:
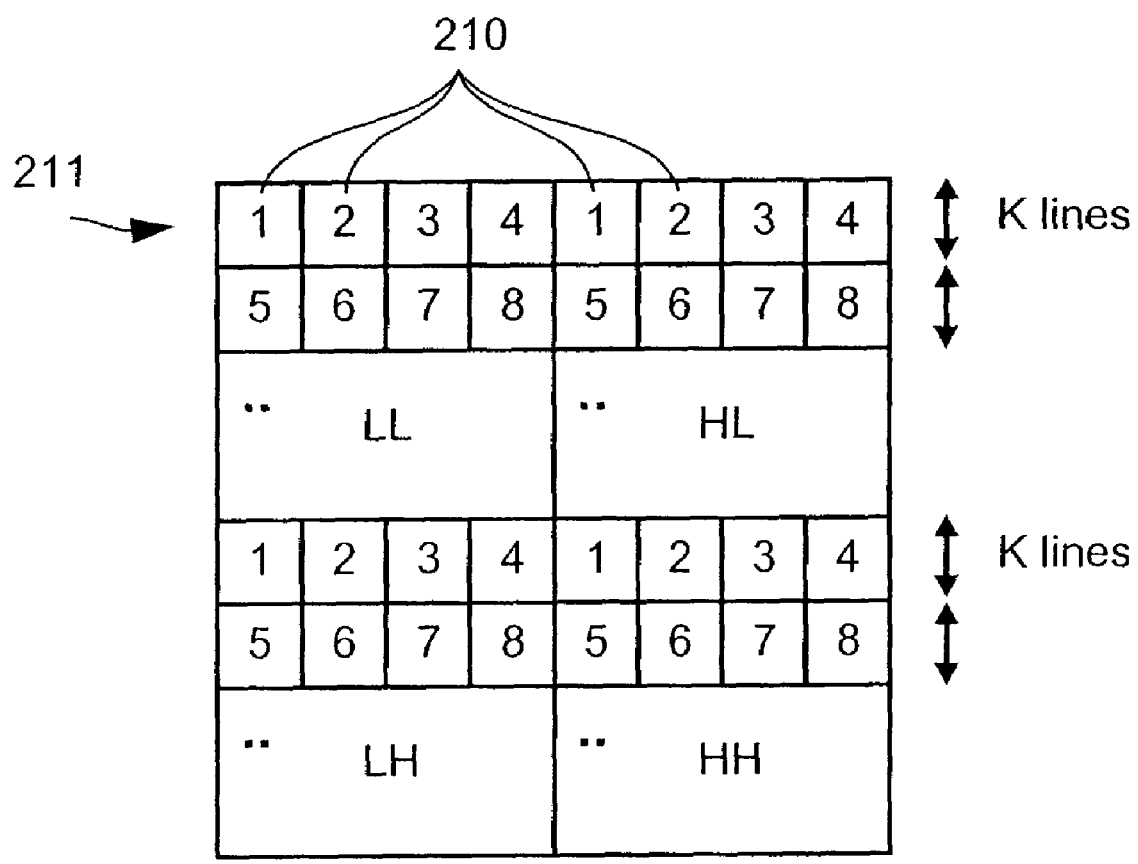
FIG. 2 illustrates the division of each subband of a DWT image into row of blocks in accordance with the preferred decoding method.

FIG. 2 illustrates a single level DWT 200 of an image, and the tiling of each subband LL, HL, LH, HH into blocks 210 each comprising K×K coefficients. In each subband LL, HL, LH, HH there are four blocks per row of blocks. Hence, there are 4K coefficients per row in each subband. The image upon which the DWT is performed can in fact be any array of samples, such as some intermediate LL subband, and need not necessarily be an original (spatial domain) image. However, in order to differentiate the input and output of the single level DWT, the array of samples input to the single level DWT is referred to as the (input) image, while the output is referred to as a (single level) DWT image (i.e. 200) (which typically consists of four subbands). Each row 211 of blocks of a subband in the DWT image, shown in FIG. 2, consists of K lines, where K is a positive integer value. Preferably, K is an integer value determining a preferred (or desired) block size for entropy coding. Corresponding to such a set of K lines are 2K lines of the original image. For example, in the case of Haar filters, 2K lines can be used to generate the K subband lines, for each of the four subbands, and visa-versa, so that there is a one-to-one correspondence between one level and a next level. However, those skilled in the art will appreciate that for other (longer) filters, a number of extra image lines may be required to generate the K subband lines at a next level of DWT decomposition. For example, in the case of 9/7 Daubechies filters, another seven lines of the input image, giving 2K+7 in total are required to produce K lines at a next level. In addition at synthesis extra subband lines, in addition to the K lines from each of the four subbands, are required to produce the 2K corresponding image lines of the previous level. For the 9/7 Daubechies filters the LL and HL subband require 3 extra subband lines, while the LH and HH require 4 extra subband lines.

The Inverse One Dimensional DWT by Lifting

The one-dimensional DWT and iDWT can be implemented using a lifting scheme. An implementation of the invention preferably uses the reversible 5/3 or a 9/7 wavelet filter of type described in the JPEG2000 standard. However other filters can be used.

The single level 5/3 filter reversible iDWT of a one-dimensional signal x, as used in the JPEG 2000 standard, is defined by the lifting equations, $$x_{2n} = s_n - \lfloor (d_{n-1} + d_n + 2)/4 \rfloor$$
$$x_{2n+1} = d_n + \lfloor (x_{2n} + x_{2n+2})/2 \rfloor$$

Eqns (1)

where $x_n$ is sample n of the input signal, $d_n$ is sample n of the output one-dimensional (1D) subband highpass signal, and $s_n$ is sample n of the output 1D lowpass subband signal. Unless otherwise indicated all indices are zero based. That is the first sample of each signal is sample 0. These eqns (1), referred to as lifting equations, can be represented by a lifting lattice as illustrated in FIG. 6.

The 9/7 filter iDWT of a one-dimensional signal x, as used in the JPEG 2000 standard, is defined by the lifting equations, $$s'_n = s_n - \delta(d_{n-1} + d_n)$$
$$d'_n = d_n - \gamma(s'_n + s'_{n+1})$$

Eqn (2)

$$x_{2n} = s'_n - \beta(d'_{n-1} + d'_n)$$
$$x_{2n+1} = d'_n - \alpha(x_{2n} + x_{2n+2})$$

where α=−1.5861, β=−0.052980, γ=0.88291, δ=0.44351, $s_n$ and $d_n$ are coefficient n in the lowpass and highpass subband respectively, and $s'_n$, and $d'_n$ are intermediate values. These eqns (2), can be represented by a lifting lattice as illustrated in FIG. 3.

For the purposes of this description, the correspondence between subband samples LL, HL, LH, and HH and input image samples is defined via the process of lifting, ie the updating of the coefficient. Thus, subband coefficient (m+1, n+1) in the LL subband corresponds to input image sample (2m+2, 2n+2). Subband coefficient (m+1, n+1) in the HL subband corresponds to input image sample (2m+2, 2n+3). Subband coefficient (m+1, n+1) in the LH subband corresponds to input image sample (2m+3, 2n+2). Subband coefficient (m+1, n+1) in the HH subband corresponds to input image sample (2m+3, 2n+3).

Figure 3:
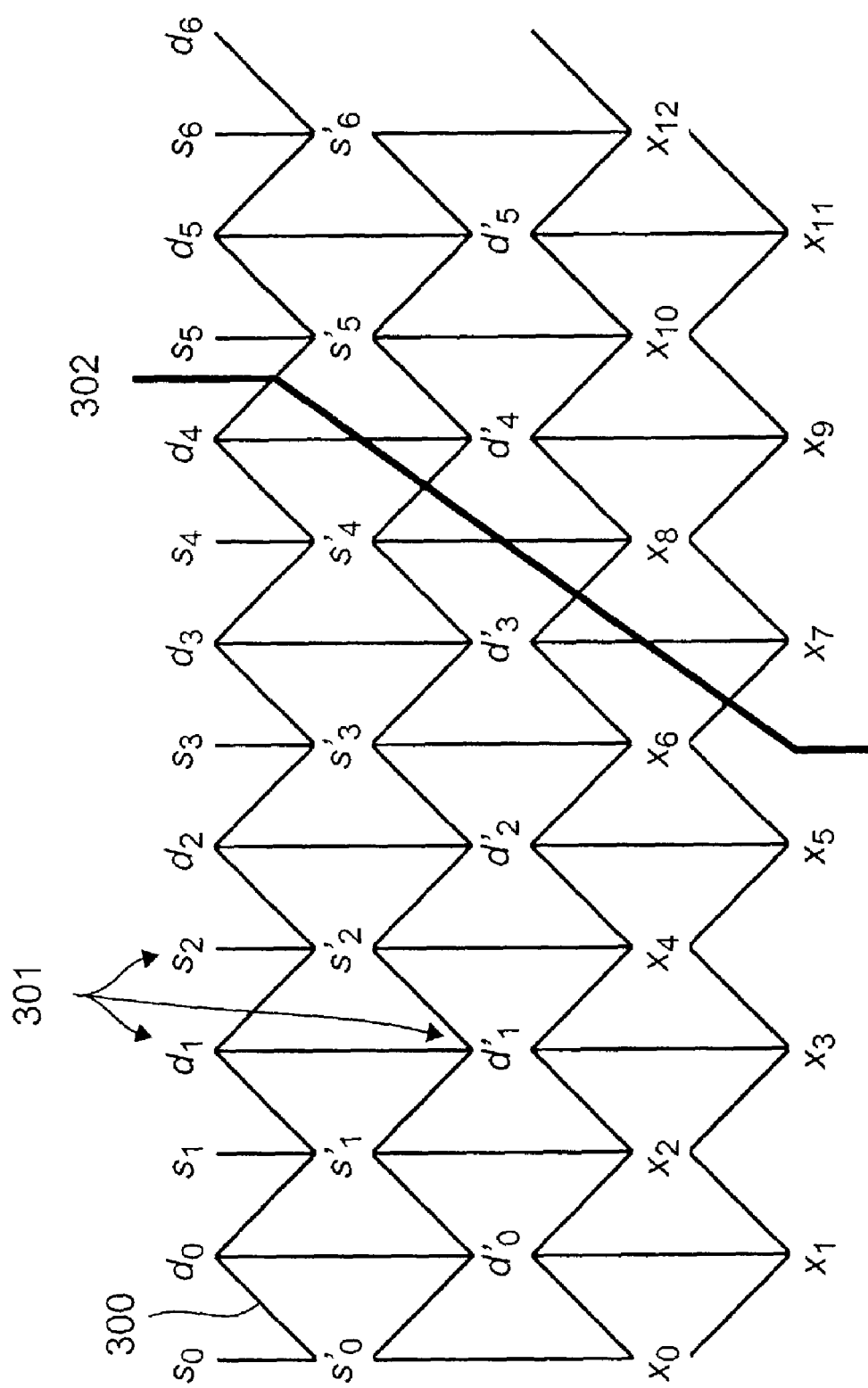
FIG. 3 is a lifting lattice of an inverse DWT 9/7 filter for use in the preferred decoding method.

Turning now to FIG. 3, the lifting scheme for an iDWT can now be described with reference to 9/7 Daubechies filters.

Consider a signal x comprising samples $x_0, x_1, x_2, \ldots$. The one dimensional DWT of this signal generates a lowpass signal s comprising samples (coefficients) $s_0, s_1, s_2, \ldots$, and a highpass signal d comprising samples (coefficients) $d_0, d_1, d_2, \ldots$. In this notation x is referred to as the image signal, and the s and d signals are referred to as subband signals. Using this notation, an iDWT signal can be inverted according to above mentioned equations (2). In addition, some scaling of the subband or output coefficients may be required depending on the scaling used for the forward transform.

Returning to FIG. 3, each line 300 between samples 301 on the lattice represents a contribution of a sample at the top end of the line to a weighted sum forming a number at the bottom end of the line 300. Thus, for example, since $d_0$, $s_1$ and $d_1$ are all connected to $s'_1$ by lines 300, and $s'_1$ is at the bottom of each line 300 we have that $s'_1$ is a weighted sum of $d_0$, $s_1$ and $d_1$. In particular, according to the lifting equation $s'_1 = s_1 - \delta(d_0 + d_1)$, and therefore lines 300 joining $d_0$ and $d_1$ to $s'_1$ are weighted by δ=0.44351 and $s_1$ by unity.

A brief explanation of the inverse DWT method is made with reference to FIG. 3. The inverse DWT method accesses a first segment of subband samples say $s_0, s_1, s_2, s_3, s_4$ and $d_0, d_1, d_2, d_3, d_4$. Corresponding to these 10 samples are the 10 first image samples $x_0, x_1, \ldots, x_9$. However the inverse DWT method can only reconstruct the first seven samples $x_0, x_1, \ldots, x_6$. It cannot reconstruct the last three samples $x_7, x_8,$ and $x_9$, without obtaining further subband samples.

At the same time as the inverse DWT method obtains this first segment of subband samples and reconstructs the first 7 image samples, it also buffers the four intermediate coefficients $x_6, d'_3, s'_4,$ and $d_4$. These are the coefficients immediately to the left of the heavy diagonal line 302 in FIG. 3, and are referred to as the lifting state. The number and type of these intermediate coefficients of the lifting state (eg. image coefficients $x_n$, intermediate coefficients $s_n'$, $d_n'$, and subband coefficients $s_n$, $d_n$) will be dependent on the type of the lifting lattice in use. Also, the AC subband coefficients and AC intermediate coefficients of the lifting state (eg. $d_4$ and $d'_3$) are referred to as the AC lifting state, and the remaining coefficients (eg. $x_6$, and $s'_4$) of the lifting state are referred to as the non-AC lifting state. Next, the inverse DWT method retrieves a second segment of subband samples, say $s_5, s_6, s_7, s_8, s_9$ and $d_5, d_6, d_7, d_8, d_9$, (some of which are not illustrated) and using the buffered lifting state data, the inverse DWT method can reconstruct the image samples $x_7$, $x_8$, and $x_9$, and also all the image samples, bar the last three, corresponding to these new subband samples. That is samples $x_{10}$, $x_{11}$, . . . , $x_{16}$. As before last three samples $x_{17}$, $X_{18}$, and $x_{19}$ cannot be reconstructed without obtaining more subband samples. If the inverse DWT method again buffers four intermediate lifting state samples and obtains a third segment of subband samples it can reconstruct another ten subband samples, and so on. Using this approach of buffering four intermediate lifting state samples, the inverse DWT method can reconstruct a signal from sequential segments of subband samples. For each segment comprising n lowpass and n highpass samples, the inverse DWT method can reconstruct 2n image samples. These are the 2n image samples corresponding to the n subband samples, excepting the last three but also including the three samples prior to these 2n samples. For finite length signals, for all but the first and last segment of n subband samples the inverse DWT method is able reconstruct 2n image samples. For the first segment the inverse DWT method reconstructs 2n−3, while for the last segment 2n+3, images samples. Using the usual symmetric boundary extension, the inverse DWT method obtains the extra last three samples for last block.

These properties of the lifting lattice are used to facilitate the implementation of the line based inverse DWT in accordance with the preferred implmentation. Convolution techniques can also be used, however, a convolution implementation will typically require seven subband samples buffered between subband segments, as opposed to four, for a lifting scheme as described above.

For filters other than the 9/7 Daubechies filter the same approach to reconstructing the signal from subband segments can be used. However more or less intermediate subband samples will need to be buffered depending on the lattice configuration (or filters). For example, for the 5/3 filters two lifting state variables are required.

Since a two-dimensional (single level) iDWT can be performed using a series of one dimensional inverse DWTs, the two-dimensional iDWT can also be performed in segments. A special case of a two-dimensional segment of a two-dimensional subband is simply a block of subband samples. Thus, the inverse DWT method can perform a single level iDWT of four subbands by processing blocks of subband samples and buffering intennediate results between blocks.

Performing a Single Level Two-Dimensional IDWT on a Block by Block Basis Using Lifting The techniques described above with reference to FIG. 3 for performing a one-dimensional iDWT in segments can be used to perform a two-dimensional iDWT on a block by block basis (a block being the two-dimensional segment).

Returning to FIGS. 1 and 2 consider the single level inverse DWT of a DWT image. Suppose the LL, HL and HH subbands are of size N×N. First the rows of the LL and HL subbands are synthesised to form an N×2N array of samples which comprise the lowpass (and decimated by 2) filtered columns of the original image. This array is labelled as $L^c$ in FIG. 1. Similarly the rows of the LH and HH subbands are synthesised to form another N×2N array of samples, which comprise the highpass (and decimated by 2) filtered columns of the original image, and is labelled $H^c$ in FIG. 1.

This row operation, as a series of one-dimensional iDWTs can be performed in segments, where the segments are say given by the block boundaries.

Figure 4:
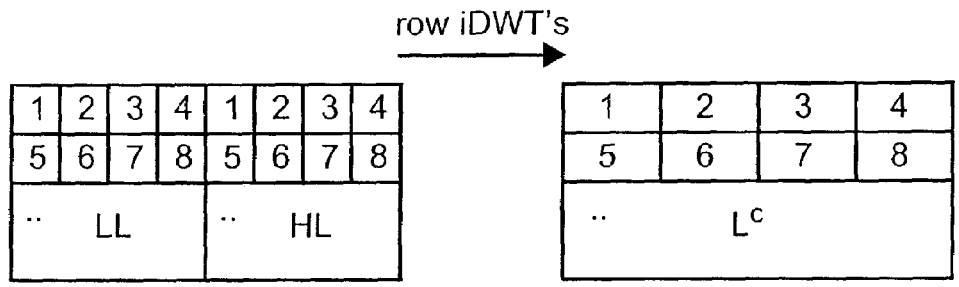
FIG. 4 shows a correspondence between blocks in the LL and HL subbands and the $L^c$ sub-image in accordance with the preferred decoding method.

Consider the row synthesis of the LL and HL subband to form the $L^c$ sub-image, as illustrated in FIG. 4. Corresponding to each block pair in the LL and HL subband is a block in the $L^c$ sub-image, which has the same number of rows as the corresponding LL (or HL) block, but has twice the number of columns. For example, the block 1 in the subband $L^c$ sub-image corresponds to the pair of blocks 1 in the LL and HL subbands. For the purposes of the inverse row transform LL subband contains the lowpass row data, while HL subband contains the highpass row data. Corresponding blocks in each of these subbands contain the corresponding lowpass and highpass data.

First consider block 1 in the LL and HL subbands. Each block consists of K rows by K columns of data. The decoding method inverse transform each row these blocks outputting 2K−3 synthesised samples per row, and buffering four intermediate subband samples, per row. These 2K−3 samples per row are the first 2K−3 samples per row of block 1 of the $L^c$ sub-image. The last 3 row synthesised samples per row, being the last three samples in each row in block 1 of the $L^c$ sub-image, cannot be reconstructed until more subband data (ie from block 2) is obtained. Thus the decoding method has reconstructed all but the last three columns of block 1 of the $L^c$ sub-image. Then the decoding method can inverse transform the K rows of block 2 (from the LL and HL subband) and, using the four buffered subband samples per row from block 1, generate the next 2K samples of each synthesised row data. That is, the last three synthesised samples of each row of block 1 of the $L^c$ sub-image and the first 2K−3 samples of each row of block 2 of the $L^c$ sub-image. Hence the decoding method has now completed the reconstruction of block 1 of the $L^c$ sub-image and reconstructed all but the last three columns of block 2 of the $L^c$ sub-image. The decoding method can similarly process block 3. Finally the decoding method can process block 4. For this block the decoding method cannot only complete the reconstruction of block 3 of the $L^c$ sub-image but also of block 4 of the $L^c$ sub-image. The last three synthesised samples of block 4 of the $L^c$ sub-image for each row can be reconstructed using the symmetric boundary extension conditions. Thus for the block 4 we synthesise 2K+3 samples per row.

The decoding method can similarly process the LH and HH subbands in block row order to produce the HC sub-image.

Figure 5:
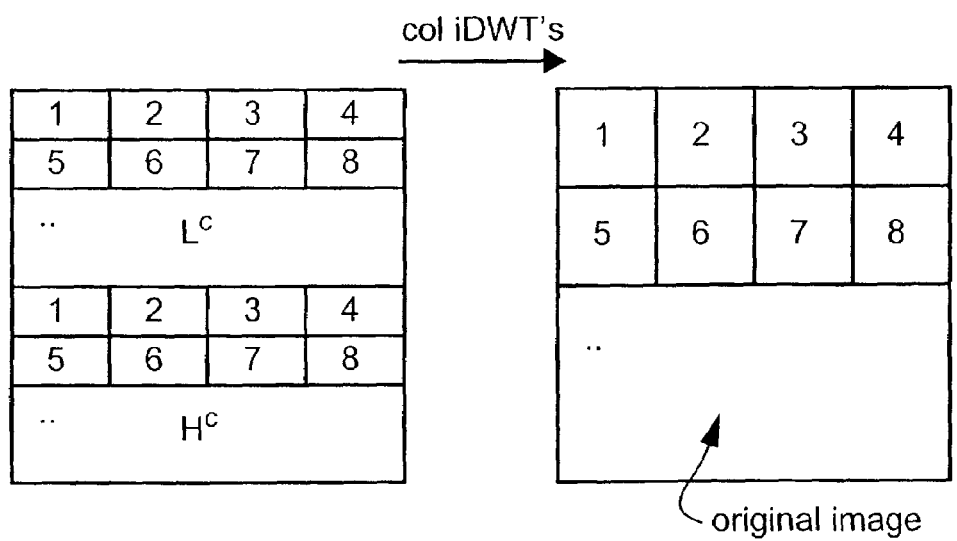
FIG. 5 shows a correspondence between blocks in the $L^c$ sub-image and $H^c$ sub-image and the original image in accordance with the preferred decoding method.

Corresponding to each pair of blocks in the $L^c$ and $H^c$ sub-images is a 2K×2K block in the original image, as illustrated in FIG. 5. For example, block 1 in the original image corresponds to the pair of blocks 1 in the $L^c$ and $H^c$ sub-images.

Turning now to FIGS. 2, and 5, it can be seen that each quadruplet of blocks in the LL, HL, LH, and HH subbands, for example the quadruplet comprising blocks 1 in LL, HL, LH, and HH (FIG. 2), correspond to one block, for example block 1, in the original image (FIG. 5).

The decoding method having performed the row synthesis for the LL and HL subbands of block 1 results in all but the last three columns of block 1 of the $L^c$ sub-image. Similarly processing block 1 for the LH and HH subbands gives all but the last three columns of block 1 of the $H^c$ sub-image. Thus, the decoding method at this stage results in the first 2K−3 columns of block 1 of the $L^c$ and $H^c$ sub-image. During the next stage, the decoding method can process column 1 of block 1 of $L^c$ sub-image and of block 1 of the $H^c$ sub-image to generate all but the last three samples of column 1 of block 1 of the original image. The decoding method can similarly process columns 2, 3, . . . , 2K−3 of these blocks. Thus during this stage, the decoding method can generate the top left hand 2K−3×2K−3 samples of block 1 of the original image. The decoding method also buffers the four intermediate subband samples for each column for use when the decoding method processes block 5.

The decoding method then processes the rows of block 2 of the LL and HL subbands and the rows of block 2 of the LH and HH subbands, and using the buffered intermediate subband data from block 1, reconstruct the last three columns of block 1 and the first 2K−3 columns of block 2 of the of $L^c$ and $H^c$ sub-image. The decoding method can then process these 2K columns to generate the top left hand 2K−3×2K−3 samples of block 2 of the original image, and also the right hand 2K−3×3 sub-block of block 1 of the original image. The decoding method also buffers the 4 intermediate subband samples for each of the 2K columns. At this stage, the decoding method has then reconstructed the first 4K−3 samples for the first 2K−3 rows of the original image. The decoding method can similarly process blocks 3 and 4, giving all of the first 2K−3 rows of the original image.

Next the decoding method processes the second row of blocks in a similar fashion. For block 5, the decoding method synthesises the rows as above. When the decoding method synthesises the columns it uses the buffered column overlap data to reconstruct the last three rows of block 1 in the original image as well as the first 2K−3 rows of block 2 of the original image (excepting the last three columns, as before). Similarly for blocks 6 and 7 it also reconstructs the last three rows of blocks 2 and 3 for the original image as well as the first 2K−3 of block 6 and 7 of the original image. For block 8, the decoding method can reconstruct all the row data, and thus reconstruct a 2K×(2K+3) block. The decoding method similarly processes all the blocks in DWT subbands.

The block based inverse DWT can be performed at a very local level, right down to 1×1 subband blocks (or 1×1 subband block quadruples), where the blocks are processed in turn in raster order from left to right, top to bottom. In this case the output will be a block of 2×2 pixels, suitably delayed due to the filter overlap required. For example for the 5/3 reversible DWT, as used in JPEG2000, a 2×2 output block of image samples x[2m+1, 2*n+1], x[2m+2, 2*n+1], x[2m+1, 2*n+2] and x[2m+2, 2*n+2], can be formed from subband samples LL[m+1, n+1], HL[m+1, n+1], LH[m+1, n+1] and HH[m+1, n+1], and a lifting state for each scanned subband block in raster order, which will be described in more detail below.

Turning now to FIG. 6, there is shown a lifting lattice for inverse DWT of 5/3 filters for illustrating the performance of 2×2 block based inverse DWT. FIG. 6 represents the 5/3 lifting lattice in a similar fashion as the 9/7 lattice that shown in FIG. 3. Namely, each line 600 between samples 601 on the lattice represents a contribution of a sample at the top end of the line to a weighted sum forming a number at the bottom end of the line 600. Thus, for example since $d_1$, $s_2$ and $d_2$ are all connected to $x_4$ by lines 600 and $x_4$ is the bottom of those lines, $x_4$ is a weighted sum of $d_1$, $s_2$ and $d_2$. It is also assumed that all samples $x_n$ to the left of the bold line 602 have been calculated during previous processing. A brief explanation of the 2×2 block based inverse DWT is now made with reference to FIG. 6 and Eqns (1). Firstly consider a single level 1D synthesis of the first column of a 1D DWT image. For example, in FIG. 6 $s_n$ and $d_n$ refer to the lowpass and highpass samples at row n in the first column of the $L^c$ and $H^c$ sub-image respectively of the 1D DWT image. For example, the image sample $x_{10}$ can be first determined from the subband samples $d_4$, $s_5$, and $d_5$ as indicated by lines 600. The image sample $x_9$ can then be determined from the previously determined sample $x_8$, the highpass sample $d_4$ and the previously determined sample $x_{10}$. That is, $$x_{10}=s_5-\lfloor(d_4+d_5+2)/4\rfloor$$

$$x_9=d_4+\lfloor(x_8+x_{10})/2\rfloor \quad \text{Eqns(3)}$$

More generally image samples $x_{2n+2}$ and $x_{2n+1}$ can be calculated in ccordance with Eqns (1) given subband data $s_{n+1}$, $d_n$, $d_{n+1}$ and image sample $x_{2n}$.

In order to obtain the image samples of the original image from a single level 2D DWT image, the computations of Eqns (1) may be applied to the rows and then the columns of a 2×2 block of the single level 2D DWT.

Pseudo-code *1 describing this 2×2 block based inverse DWT operation follows. In Pseudo code *1, x1 refers to row m+1 of the image x, x2 refers to row 2m+2 of the image, and the LL, HL, LH and HH variables refer to row 2m+1 of the corresponding subband, and XL2, XL1, XH2, XH1 are temporary variables, and the constant ROUND_LP=2.

Pseudo-Code *1:
// Horizontal Synthesis of LL and HL
XL2=LL[n+1]−((HLcur+HL[n+1]+ROUND_LP)>>2);
XL1=HLcur+((XL0+XL2)>>1);
HLcur=HL[n+1]; // Updates for next iteration across row
  (on n) XL0=XL2;
// Horizontal Synthesis of LH and HH
XH2=LH[n+1]−((HHcur+HH[n+1]+ROUND_LP)>>2);
XH1=HHcur+((XH0+XH2)>>1);
HHcur=HH[n+1]; // Updates for next iteration across row
  (on n) XH0=XH2;
// Vertical Synthesis of XL and XH, Column 2n+1
x2[2*n+1]=XL1−((XHprev[2*n+1]+XH1+ROUND_LP)
  >>2);
x1[2*n+1]=XHprev[2*n+1]+((XLprev[2*n+1]+x2[2*n+
  1])>>2);
XHprev[2*n+1]=XH1; // Update for next iteration down
  column (on m) XLprev[2*n+1]=x2[2*n+1];
// Vertical Synthesis of XL and XH, Column 2n+2
x2[2*n+2]=XL2−((XHprev[2*n+2]+XH2+ROUND_LP)
  >>2);
x1[2*n+2]=XHprev[2*n+2]+((XLprev[2*n+2]+x2[2*n+
  2])>>2)
XHprev[2*n+2]=XH2; // Update for next iteration down
  column (on m)
XLprev[2*n+2]=x2[2*n+2];

If AC subband coefficients HL[n+1], LH[n+1] and HH[n+1] are known to be zero, and the AC lifting state variables HLcur, HHcur, XH0, XH1, XHprev[2*n+1] and XHprev [2*n+1] are known to be zero then the operations can be simplified to the following Pseudo-code *2. The AC lifting state variables are those lifting state variables that are zero in steady-state when AC subband data is zero.

Pseudo-Code *2
// Horizontal Synthesis of LL and HL
XL2=LL[n+1];
XL1=((XL0+XL2)>>1);
XL0=XL2;
// Horizontal Synthesis of LH and HH—Nothing to do
// Vertical Synthesis of XL and XH, column 2n+1
x2[2*n+1]=XL1;
x1[2*n+1]=((XLprev[2*n+1]+x2[2*n+1])>>1);
XLprev[2*n+1]=x2[2*n+1];
// Vertical Synthesis of XL and XH, Column 2n+2
x2[2*n+2]=XL2;
x1[2*n+2]=((XLprev[2*n+2]+x2[2*n+2])>>1);
XLprev[2*n+2]=x2[2*n+2];

Also note that the lifting state variables HLcur, HHcur, XH0, XH1, XHprev[2*n+1] and XHprev[2*n+1] do not need to be updated as they remain at zero. This simplified pseudo-code (Pseudo-code *2) is referred to as the zero speed-up pseudo-code. The previous Pseudo-code *1 can be used as the default pseudo-code. If the relevant variables are known to be zero there is a substantial saving in computation using the zero speed-up pseudo-code. For the 5/3 filters illustrated here, the speed up is something in the order of four times less adds and shifts.

To know that the AC subband coefficients and the AC lifting state variables are zero requires testing of this data. It is important that the test itself does not substantially slow the operation of the inverse DWT procedure, otherwise the purpose of speeding up the inverse DWT is defeated.

The above pseudo-code procedures synthesize a 1×1 block of subband quadruples (a 1×1 block from each of the LL, HL, LH and HH subbands) to form a 2×2 output block. Larger blocks of subband quadruples can be synthesized with the above pseudo-code procedures. For example a 32×32 block of subband quadruples can be synthesized to form a 64×64 output image block. For larger subband block quadruples, the above pseudo-code procedures become the code in an inner loop of a two-dimensional loop iterating over preferably the rows first (outer loop) and then columns (inner loop) of the larger subband block quadruple. The inner loop moves across a row (looping over columns) of 1×1 subband block quadruples. The horizontal lifting state is required for the next inner loop iteration only, and hence can be stored in the scalar variables HLcur, HHcur, XL0, and XH0. The vertical lifting state needs to be remembered for a whole row of subband block quadruples and hence is stored in the vector (pointer) variables XLprev and XHprev. The horizontal lifting state, HLcur, HHcur, XL0, and XH0 does need to be buffered for each row of the larger subband block quadruple, between synthesis of horizontally adjacent larger subband block quadruples. Further the vertical lifting state (the XHprev and HLprev vectors) needs to be buffered between synthesis of vertically adjacent subband block quadruples. This buffering is achieved with the same vectors (or a super-set thereof) for XHprev and XLprev.

If it is known that all relevant AC subband coefficients and lifting state variables are zero then a larger subband block quadruple can be synthesized using the zero speed-up pseudo-code as the code in the inner loop. Whether or not a code-block (ie. one out of four blocks in a subband block quadruple) of subband data is zero is easily (and with no computational cost) determined from the entropy decoder, for a block-based DWT image compression. It remains to test if the AC lifting state for a given subband block is zero.

After the pseudo-code procedures given above have been iterated across a column, a simple operation can determine if any horizontal AC lifting state in any preceding row is non-zero by using an or operation (|) as follows:

is_hls_nonzero|=(XH0|HLcur|HHcur).

If any of XH0, HLcur, and HHcur are non-zero then is_hls_nonzero will become non-zero. Once is_hls_nonzero is non-zero, it will remain so regardless of future such or operations. After the pseudo-code procedures given above have been iterated across all the rows of a subband block quadruple, the is_hls_nonzero variable can be buffered for when synthesizing the next horizontal larger subband block quadruple. If is hls_nonzero is zero, then all the horizontal AC lifting state for the next larger subband block quadruple is zero.

The vertical lifting state gets updated in the inner loop (ie. within the above pseudo-code procedures). It is not desirable to test this lifting state in the inner loop, since it may substantially effect the speed of the loop. Before synthesizing a larger subband block quadruple, if the corresponding is_hls_nonzero state flag is zero, then the relevant vertical lifting state can be tested to see if it is all zero. It is necessary to test XHprev[n] where n is relevant to the subband block quadruple. If the vertical lifting state is also zero then the subband block quadruple can be synthesized with the zero speed-up pseudo-code method. Otherwise the default method is used. In this way the testing overhead is substantially insignificant, for reasonable sized blocks.

C code implementing the above described 5/3 block engine is given in Appendix A.

The 2×2 block based inverse DWT can also be implemented using a 9/7 reversible DWT in similar fashion to the 2×2 block based DWT described above.

Decoding an Image with a Block Based Zero Speed-Up Inverse DWT

Preferably, the blocks of each subband of a DWT image have been entropy coded, where the block size is fixed across all subbands and each block consists of has K rows of data. For situations where variable block sizes are used, preferably K is the number of rows of the block with the most number of rows (or possibly the least common multiple of the number of rows in each block). Preferably, also square blocks are used so that the block dimensions are K×K. However, rectangular blocks can also be used.

Preferably, the decoding method uses an external memory buffer of 3K lines for each intermediate LL subband. That is, for a J level DWT, the decoding method uses LL1, LL2, . . . and LL(J−1) buffers, each having 3K lines, where the line length is the length of the LL1 subband. Further for each level, the decoding method uses a 2 line buffer which is referred to herein as a col_overlap buffer, and which contains the vertical lifting state between subband block quadruples. The line length for this buffer is the length the LL subband lines at the next lower level. Thus the col_overlap buffer for level 1 has a line length the same as the line length of the output image.

Preferably, the decoding method uses four internal memory buffers each of size K×K which are referred to herein to as LL, HL, LH and HH block buffers. There are two additional internal memory buffers. One comprising 2 columns by 2K rows, which is referred to herein as row_overlap buffer (which contains the horizontal lifting state between subband block quadruples), and one comprising 2 rows by 2K+3 columns which is referred to herein as the col_overlap (internal) buffer.

For some applications, depending on the image line length, it may be possible that the external col_overlap buffer is a local memory buffer. In this case the internal col_overlap buffer is not needed. Further, for a general purpose computer these buffers may not explicitly be designated as external or internal. The idea is that data held in internal buffers is held in the processor cache, and hence is accessible more quickly than data in external memory. In this way some buffers may operate as external and internal buffers at different times.

The decoding method in accordance with the preferred implementation is based around a single level two-dimensional iDWT engine that processes nominally K subband lines, for each of the four subbands at level j, and produces nominally 2K lines of LL(j−1) data. As explained above the correspondence between these input K subband lines and output 2K lines is not exact. However, by maintaining some overlapping data we can usually produce 2K LL(j−1) subband lines for K lines input for each of the level j subbands.

Figure 7:
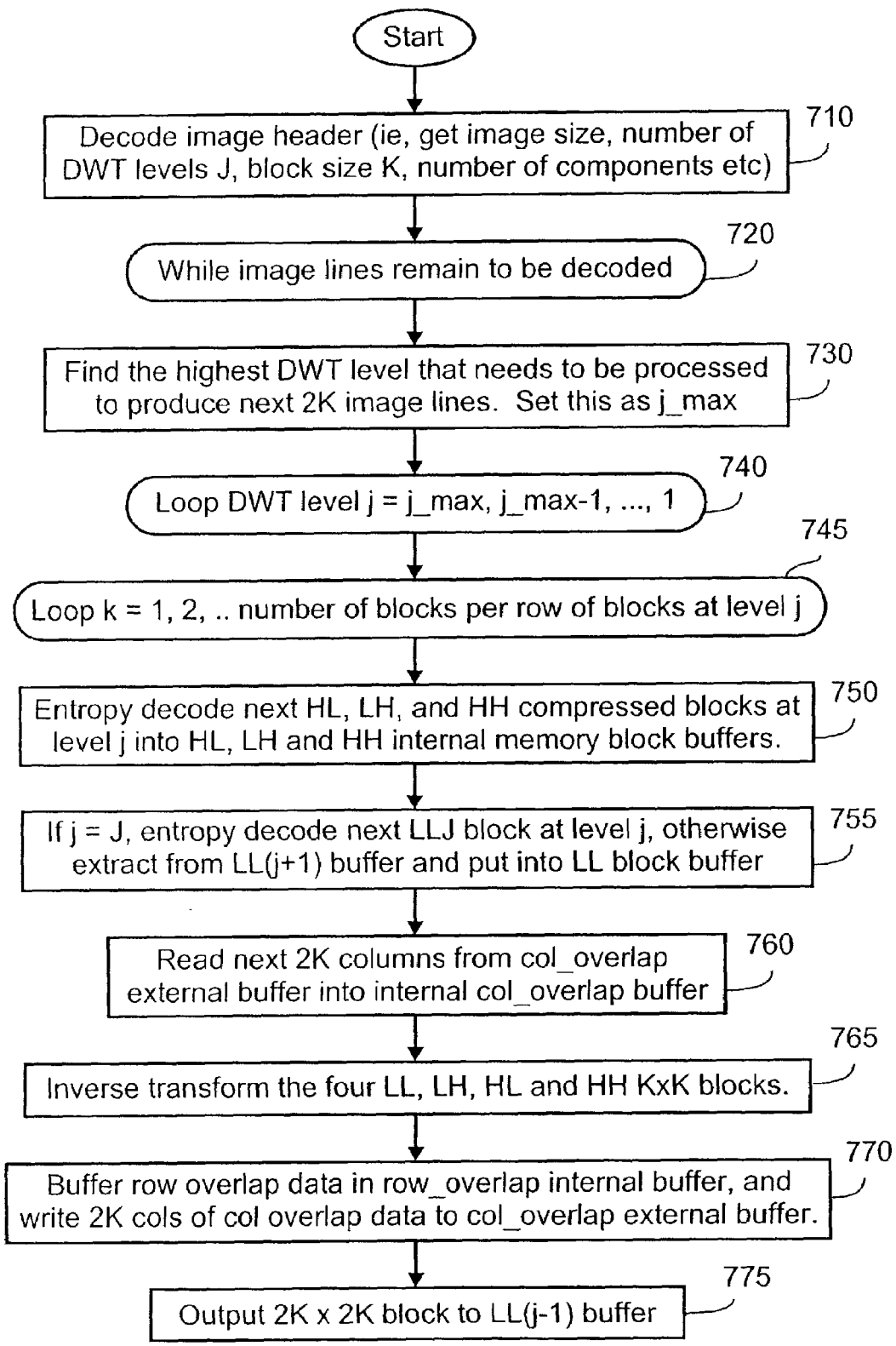
FIG. 7 is a flow-chart of a method of decoding a coded representation of an image in accordance with the preferred implementation.

Turning now to FIG. 7, the decoding method can be described with reference to a flow chart which begins at Step 710 by decoding the compressed image header. From the header, image information such as size, number of DWT levels employed, and entropy coding block size are determined.

At step 720 a loop is entered that terminates when there are no more image lines to decode. Normally 2K image lines are, decoded and output per iteration. For the first iteration only 2K−3 lines are decoded and for the last iteration up to 2K+3 lines are decoded. To obtain 2K image lines, (at least) K lines for each of the level one subbands are required. The K lines for the AC subbands can be obtained by decoding the appropriate row of blocks in each AC subband. But the decoding method still need K lines from the LL1 subband. If the LL1 buffer has less than K lines in it the decoding method needs to process the level two subbands, with the single level iDWT engine, to fill the LL1 buffer with more lines, which in turn requires that the LL2 buffer has at least K lines in it. If this is not the case, the decoding method needs to process K lines of the level 3 with the single level iDWT engine subbands and so on. Step 730 then determines the highest such DWT level needed to be processed. Given a J level DWT, j_max is the smallest integer less than or equal to J such that the LL1, LL2, ..., LL(j_max-1) buffers each have less than K lines of data in them, while LL(j_max) has at least K lines in it. If all the LL buffers have less than K lines in them then j_max is J, as is the case for the first iteration.

At step 740 a loop is entered that iterates from j=j_max to j=1, decrementing j by one at each iteration. At each iteration the decoding method processes, with the single level iDWT engine, substantially K lines of each of the four subbands at level j producing nominally 2K lines of the LL(j−1) subband. The K lines the decoding method processes are the K lines in the first unprocessed row of blocks in the level j subbands. In other words, for a given level j each time this loop is entered the decoding method processes the next row of blocks.

Figure 8:
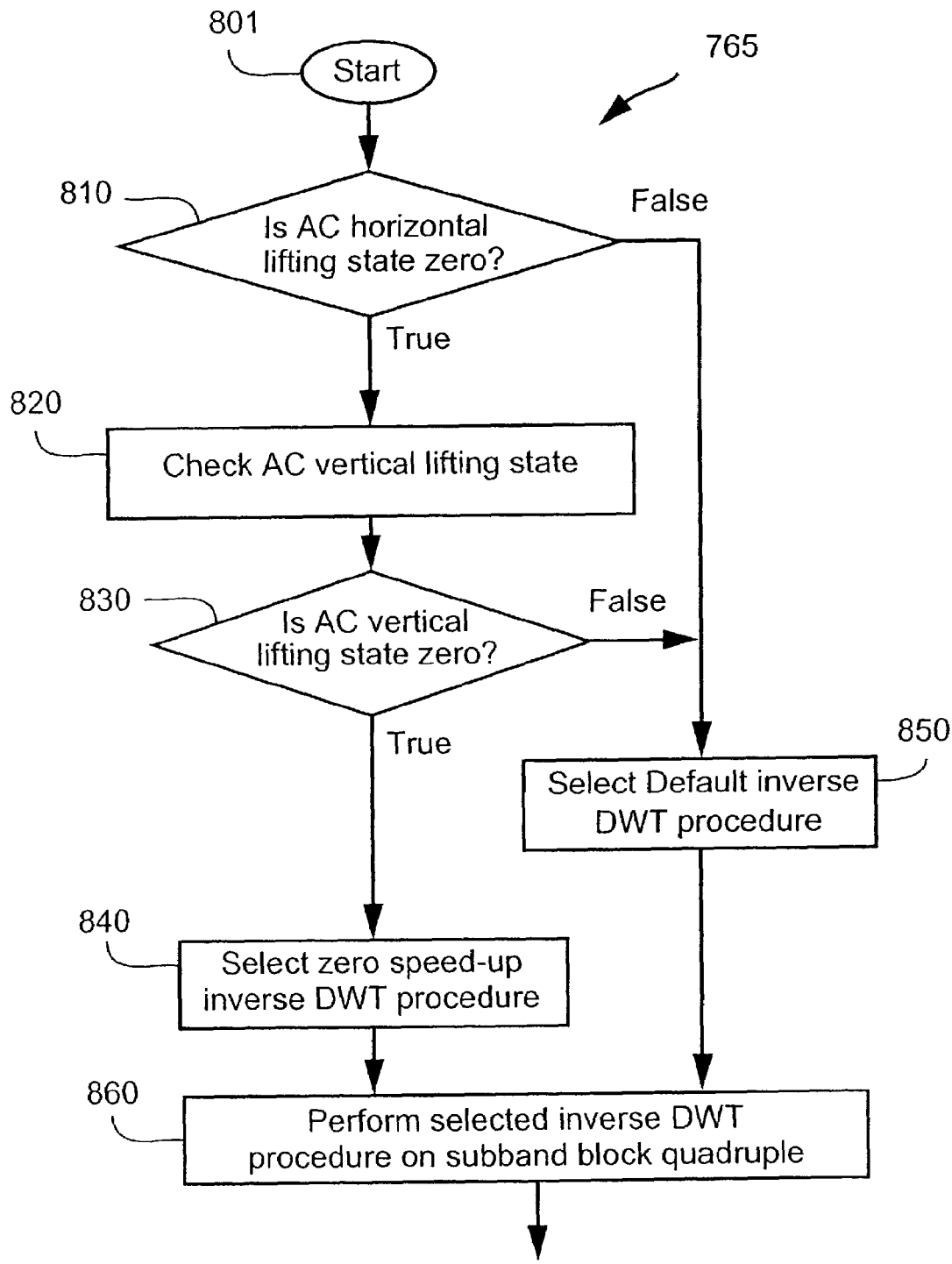
FIG. 8 is a flow chart of step 765 of the preferred decoding method shown in FIG. 7.
Figure 9:
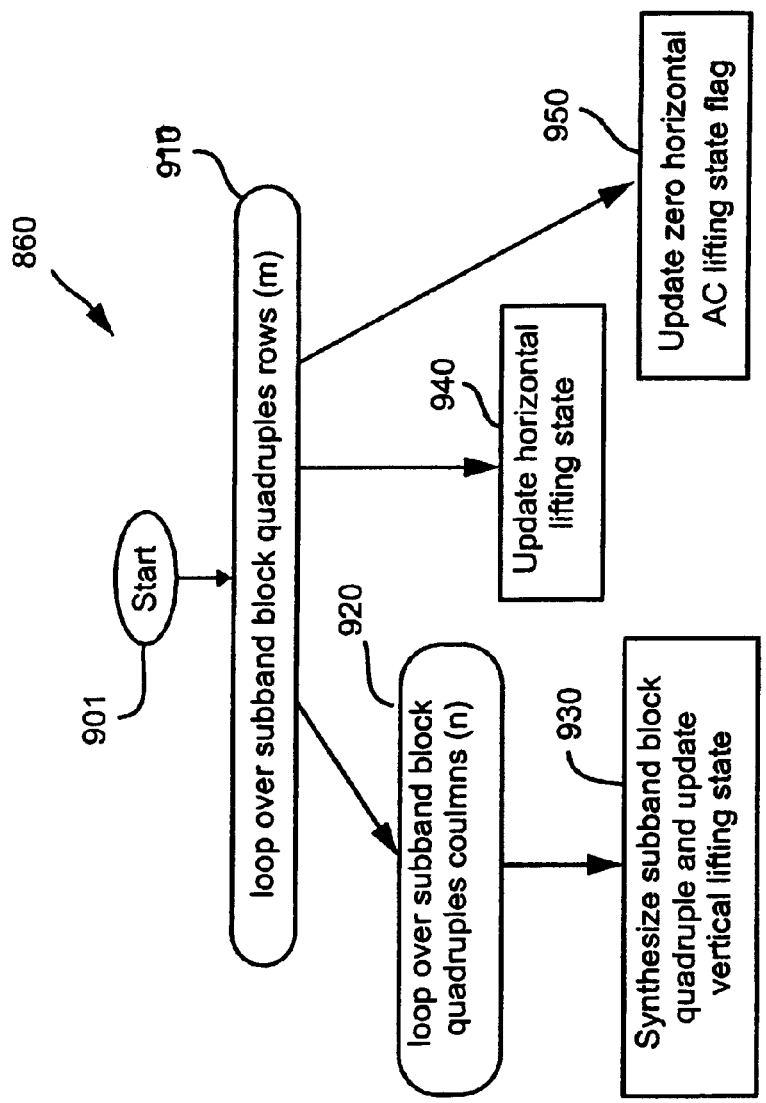
FIG. 9 is a flow chart of sub-step 860 of step 765 of the preferred decoding method shown in FIG. 7.

At step 745 a loop is entered that iterates over the number of blocks per row of blocks for the subbands at level j. At step 750, block k in the current row of blocks is decoded for each of the HL, LH and HH subbands and the data placed in the (K×K) HL, LH and HH local memory buffers. At step 755, the corresponding (K×K) block of LL data is put into the LL local memory buffer either by decoding block k in the current row of blocks in the LLJ subband (in the case that j=j), or by reading the data from the LLj external memory buffer. At Step 760, the next 2K columns are read from the external col_overlap buffer into the internal col_overlap buffer. At Step 765, the four block buffers, LL, HL, LH and HH, and the row and col overlap internal buffers are then inverse transformed with a single level iDWT to produce nominally a 2K×2K output block of coefficients at level j−1. FIGS. 8 and 9 illustrate the operation of Step 765 in more detail.

At Step 770, the intermediate row subband data needed for the next block in the current row of blocks is buffered in the internal row_overlap buffer. Similarly the intermediate column data that is needed for inverse transforming the block immediately below the current block in each subband is buffered in the col_overlap external buffer. At Step 775, the nominally 2K×2K output data block is written to the LL(j−1) buffer.

The synthesis of a subband block quadruple in Step 765 is explained further with reference to FIG. 8. In Step 801 the process of FIG. 8 commences. In decision block 810 a test is made to determine if the AC horizontal lifting state for the current subband block quadruple is zero, ie HLcur, Hhcur, XL0, XH0 are all zero. If decision block 810 returns true processing continues at Step 820. If decision block 810 returns false processing continues at Step 850.

In Step 820 a test is made to determine if the AC vertical lifting state for the current subband block quadruple is zero, ie Xlprev and Xhprev are all zero. This test preferably involves testing the AC lifting state for each column in the subband block quadruple. If decision block 830 returns true processing continues at Step 840. Otherwise processing continues at Step 850.

In Step 840 a zero speed-up inverse DWT procedure is selected as the procedure for performing the inverse DWT of the subband block quadruple. In Step 850 the default inverse DWT procedure is selected as the procedure for performing the inverse DWT of the subband block quadruple. In Step 860 the inverse DWT of the subband block quadruple is performed using the selected procedure.

The inverse DWT of the subband block quadruple of step 860 is now described with reference to FIG. 9. This procedure describes both the default and zero speed-up inverse DWT procedures. Processing commences in Step 901.

In Step 910, a loop is entered that loops over the rows (m) of the subband block quadruple. For K x K blocks there are K row iterations. In Step 920, a loop is entered that loops over the columns (n) of the subband block quadruple. In Step 930, a 2×2 output image block is synthesized by performing the inverse DWT procedure of the current subband coefficient location (m, n): that is of the current 1×1 subband block quadruple. For the zero speed-up method this is preferably implemented as described by the zero speed-up pseudo-code described above. For the default method this is preferably implemented as described by the default pseudo-code described above.

After the column iterations have finished, (at the end of each row iteration) the horizontal lifting state is updated in Step 940, for the next horizontally adjacent subband block quadruple. In Step 950 a zero horizontal AC lifting state flag, for the next horizontally adjacent subband block quadruple is updated to reflect if any relevant lifting state is non-zero. This flag is tested in Step 710 of FIG. 7 to determine if the relevant horizontal lifting state is zero.

The aforementioned decoding method described with reference to FIGS. 7 to 9 is preferably based on the reversible 5/3 or on the 9/7 wavelet filter of the type described in the JPEG2000. In the case where the 5/3 wavelet filter is used, FIGS. 8 and 9 are preferably implemented as described by the C code in Appendix A.

Preferred Implementations of Apparatus and Computer Program

Figure 10:
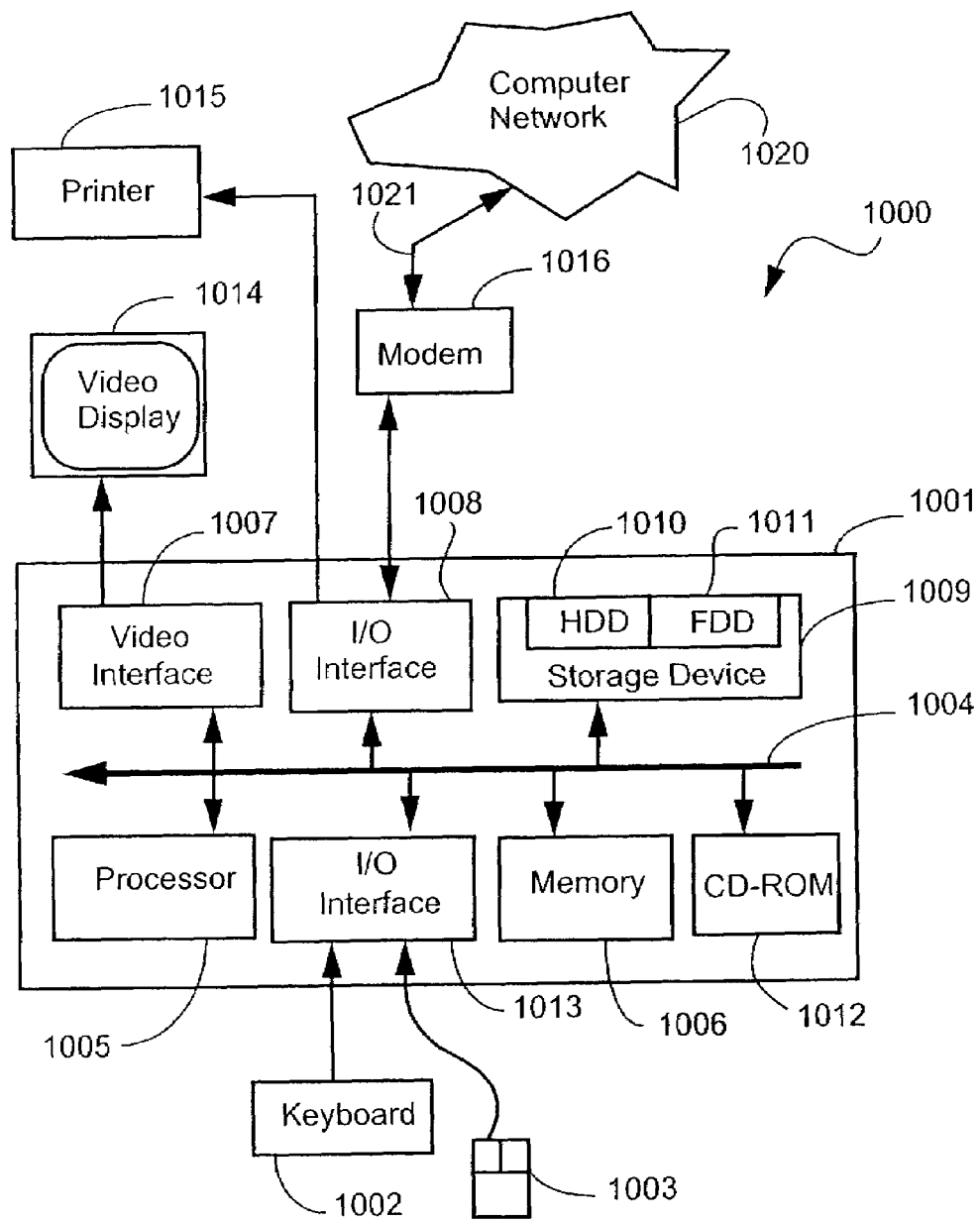
FIG. 10 is a schematic representation of a general-purpose computer for use in implementing the decoding method of FIG. 7; and Appendix A is a C code implementation of a 5/3 iDWT block engine

The method of performing a two-dimensional inverse discrete wavelet transform on a digital image in accordance with the preferred implementation are preferably practiced using a conventional general-purpose computer system 1000, such as that shown in FIG. 10 wherein the method are implemented as software, such as an application program executing within the computer system 1000. In particular, the steps of the method are effected by instructions in the software that are carried out by the computer (e.g. Appendix A). The software may be divided into two separate parts; one part for carrying out the discrete wavelet transform method; and another part to manage the user interface between the latter and the user. The software may be stored in a computer readable medium, including the storage devices described below, for example. The software is loaded into the computer from the computer readable medium, and then executed by the computer. The use of the computer readable medium in the computer preferably effects an advantageous apparatus for performing the preferred method in accordance with the implementations of the invention.

The computer system 1000 comprises a computer module 1001, input devices such as a keyboard 1002 and mouse 1003, output devices including a printer 1015 and a display device 1014. A Modulator-Demodulator (Modem) transceiver device 1016 is used by the computer module 1001 for communicating to and from a communications network 1020, for example connectable via a telephone line 1021 or other functional medium. The modem 1016 can be used to obtain access to the Internet, and other network systems, such as a Local Area Network (LAN) or a Wide Area Network (WAN).

The computer module 1001 typically includes at least one processor unit 1005, a memory unit 1006, for example formed from semiconductor random access memory (RAM) and read only memory (ROM), input/output (I/O) interfaces including a video interface 1007, and an I/O interface 1013 for the keyboard 1002 and mouse 1003 and optionally a joystick (not illustrated), and an interface 1008 for the modem 1016. A storage device 1009 is provided and typically includes a hard disk drive 1010 and a floppy disk drive 1011. A magnetic tape drive (not illustrated) may also be used. A CD-ROM drive 1012 is typically provided as a non-volatile source of data. The components 1005 to 1013 of the computer module 1001, typically communicate via an interconnected bus 1004 and in a manner, which results in a conventional mode of operation of the computer system 1000 known to those in the relevant art. Examples of computers on which the implementations can be practised include IBM-PC's and compatibles, Sun Sparcstations or alike computer systems evolved therefrom.

Typically, the application program of the preferred implementation is resident on the hard disk drive 1010 and read and controlled in its execution by the processor 1005. Intermediate storage of the program and any data fetched from the network 1020 may be accomplished using the semiconductor memory 1006, possibly in concert with the hard disk drive 1010. In some instances, the application program(s) may be supplied to the user encoded on a CD-ROM or floppy disk and read via the corresponding drive 1012 or 1011, or alternatively may be read by the user from the network 1020 via the modem device 1016. Still further, the software can also be loaded into the computer system 1000 from other computer readable medium including magnetic tape, a ROM or integrated circuit, a magneto-optical disk, a radio or infra-red transmission channel between the computer module 1001 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The preferred method in accordance with the implementations may alternatively be implemented in dedicated hardware such as one or more integrated circuits performing the functions or sub functions of the method. Such dedicated hardware may include graphic processors, digital signal processors, or one or more microprocessors and associated memories.

INDUSTRIAL APPLICABILITY

It is apparent from the above that the implementation of the invention is applicable to computer graphics, digital communication and related industries.

The foregoing describes some implementations of the present invention, and modifications and/or changes can be made thereto without departing from the scope and spirit of the invention, the implementations being illustrative and not restrictive.

APPENDIX A

```
/*
 * C code implementation of the 5/3 irreversible DWT block engine using
 * the standard method, or if possible calling the zero speed-up method.
 */ define ROUND_LP 2
METHODDEF_EXTERN(void)
L53_BLOCK_ENGINE_FN (
    the_j2k_tile_decoder_ptr cinfo,
    j2k_idwt_block_engine_ptr self,
    JVOIDARRAY    output_data,
    JDIMENSION    start_row,
    JDIMENSION    start_col,
    JDIMENSION    block_height,
    JDIMENSION    block_width,
    JVOIDARRAY    vert_lift_mem,
    boolean       is_first_block_row,
    boolean       is_first_block_col,
    JVOIDARRAY    horiz_lift_mem,
    JVOIDARRAY    ip_LLbuf,
    JDIMENSION    ip_LL_line_offset,
    JCOEFARRAY_EC HLblock,
    JCOEFARRAY_EC LHblock,
    JCOEFARRAY_EC HHblock,
    OP_LL_DATA_TYPE op_LL_data_type,
    boolean       is_AC_blocks_zero,
    JUBYTE        *is_hp_horiz_lift_state_zero,
    JUBYTE        *is_hp_vert_lift_state_zero,
    JFLOAT        *qstep)
{ int m,n;
    JDIMENSION op_delay = 1;
    OUTPUT_ARRAY_TYPE op_LL_array = (OUTPUT_ARRAY_TYPE)
        output_data + start_row + op_delay;
    OUTPUT_ROW_TYPE x1;
    OUTPUT_ROW_TYPE x2;
    JINT32 is_hls_nonzero = 0;

#ifdef USE_RANGE_LIMIT
    my_idwt_block_engine_ptr idwtbe = (my_idwt_block_engine_ptr) self;
    JSAMPLE *range_limit = idwtbe->jsample_range_limit_table;
endif /*
     * NOTE: On a pentium int arithmetic is much faster than short int arithmetic
```

```
     * Thus we want to do the arithmetic with int's and not short ints.  Thus the
     * following variables are JINT32 (int on a pentium) to force int arithmetic
     * regardless of whether JCOEF_EC is of type int or short int.
     */
 5
    // XLi is coef XL(m+1,2n+i), and similarly XHi is coef XH(m+1,2n+i).
    JINT32 XL0 = 0, XL1 = 0, XL2 = 0;
    JINT32 XH0 = 0, XH1 = 0, XH2 = 0;
    JINT32 HLcur, HHcur; // HLcur = HL[m+1,n], HHcur = HH[m+1,n].
10  JINT32 HLnext, LHnext, HHnext;

INPUT_LLBUF_ROW_TYPE LL;
    JCOEFROW_EC HL;
    JCOEFROW_EC LH;
15  JCOEFROW_EC HH;

// XHprev points at row m of XH, and similarly XLprev points at row m of XL
    JCOEFROW_EC XHprev = (JCOEFROW_EC)vert_lift_mem[0] + start_col;
    JCOEFROW_EC XLprev = (JCOEFROW_EC)vert_lift_mem[1] + start_col;
20  JCOEFROW_EC horiz_itx_Lprev = (JCOEFROW_EC)horiz_lift_mem[0];
    JCOEFROW_EC horiz_itx_Hcur = (JCOEFROW_EC)horiz_lift_mem[1];

/*
     * We can do a faster idwt if the AC coefficients are zero.  We check for
25   * this case, and if possible we do it
     */
    if (is_AC_blocks_zero && *is_hp_horiz_lift_state_zero) {
      JINT32 is_vls_nonzero = 0;
      //Check vertical lifting state
30    for (n = -1; n < (int) block_width-1; n++) {
        is_vls_nonzero |= (XHprev[2*n+1] | XHprev[2*n+2]);
      }
      if (is_vls_nonzero == 0) {
        if (op_LL_data_type == ENUM_JSAMPLE) {
35        //printf("Doing fast zero AC idwt\n");
          L53_coefsamp_zerohf_iblock_engine (cinfo, self, output_data, start_row,
            start_col, block_height,block_width, vert_lift_mem,
            is_first_block_row, is_first_block_col, horiz_lift_mem, ip_LLbuf,
            ip_LL_line_offset, HLblock, LHblock, HHblock, op_LL_data_type,
40          is_AC_blocks_zero, is_hp_horiz_lift_state_zero,
            is_hp_vert_lift_state_zero, qstep);
          return;
        }
        else {
45        L53_coefcoef_zerohf_iblock_engine (cinfo, self, output_data, start_row,
            start_col, block_height,block_width, vert_lift_mem,
            is_first_block_row, is_first_block_col, horiz_lift_mem, ip_LLbuf,
            ip_LL_line_offset, HLblock, LHblock, HHblock, op_LL_data_type,
            is_AC_blocks_zero, is_hp_horiz_lift_state_zero,
```

```
            is_hp_vert_lift_state_zero, qstep);
        return;
      }
    }
  }

/*
   * Initiliase the vertical lifting state (XHprev only) for the first
   * iteration on m (m=-1). We need to generate XHprev[2n+1], XHprev[2n+2] for
   * n = -1,0,..block_width-1, for the vertical synthesis of row m+1 = 0 below.
   * We do not need to generate XLprev, as this does not effect the first row
   * (XHprev here is row -1).As XHprev contains pre-update values we only need
   * do the inverse row transformion (as in producing XH1 and XH2,
   * for n = -1,0,..block_width-1.)
   */
  if (is_first_block_row) {
    // First update the inverse row transform values
    LH = LHblock[0];
    HH = HHblock[0];
    // Generate horizontal lifting state to effect a symm. extension
    if (is_first_block_col) {
      XH0 = 0; // we don't care here
      SIGN_MAG_TWOS_COMPLIMENT_CONVERSION(HHcur, HH[0],
  JCOEF_EC_MIN);
    }
    else { // Get horizontal lifting state from buffer
      XH0 = horiz_itx_Lprev[1]; //Highpass row is in row 2m+1
      HHcur = horiz_itx_Hcur[1];
    }
    for (n = -1; n < (int)block_width-1; n++) {
      SIGN_MAG_TWOS_COMPLIMENT_CONVERSION(LHnext, LH[n+1],
  JCOEF_EC_MIN);
      SIGN_MAG_TWOS_COMPLIMENT_CONVERSION(HHnext, HH[n+1],
  JCOEF_EC_MIN);
      XHprev[2*n+2] = (JCOEF_EC)
        (LHnext - ((HHcur + HHnext + ROUND_LP) >> 2)); // XH2 value
      XHprev[2*n+1] = (JCOEF_EC)
        (HHcur + ((XH0 + XHprev[2*n+2]) >> 1)); // XH1 value
      XH0 = XHprev[2*n+2]; // Update for next interation (on n)
      HHcur = HHnext;
    }
  }
  else {
    //Lifting state was intialised when block above was synthesized
  }

/*
   * We set x1, an output row pointer, so that for m = -1 (overlap = 1) it
   * points at the first available output row. Lines pointed at by x2 and for
```

```
       * x1 (m>=0) follow in order from there. We also offset x1 and x2 by
       * start_col (which equals 2lW - see the calling function extract_lines
       * method of a single level iDWT object) so that as we are really generating
       * output data points (2kH+2m+1, 2lW+2n+1) etc.
 5     */
      for (m = -1; m < (int) block_height-1; m++) {
      // Set input and output row pointers
      x1 = op_LL_array[2*m+1] + start_col;
      x2 = op_LL_array[2*m+2] + start_col;
10    /*
       * Point LL, HL, LH and HH so that we access row kH+m+1 in each subbands,
       * and then samples lW+n+1(2) in this row.
       */
      LL = (INPUT_LLBUF_ROW_TYPE)ip_LLbuf[m+1];
15    LL += ip_LL_line_offset;
      HL = HLblock[m+1]; // Offset pointers by the scan row
      LH = LHblock[m+1];
      HH = HHblock[m+1];

20    //Initialise the horizontal lifting state for the first iteration (n=-1)
      if (is_first_block_col) {
      //We don't need XL0 and XH0, because we don't care about op samp -1 here
      XL0 = 0;
      XH0 = 0;
25    SIGN_MAG_TWOS_COMPLIMENT_CONVERSION(HLcur, HL[0],
      JCOEF_EC_MIN);
      SIGN_MAG_TWOS_COMPLIMENT_CONVERSION(HHcur, HH[0],
      JCOEF_EC_MIN);
      }
30    else {
      // "Current" row being synthesized is row m+1, hence get state from
      // rows 2(m+1)=2m+2 and 2(m+1)+1 = 2m+3
      XL0 = horiz_itx_Lprev[2*m+2];
      XH0 = horiz_itx_Lprev[2*m+3];
35    HLcur = horiz_itx_Hcur[2*m+2];
      HHcur = horiz_itx_Hcur[2*m+3];
      } for (n = -1; n < (int) block_width - 1; n++)
40    {
      SIGN_MAG_TWOS_COMPLIMENT_CONVERSION(HLnext, HL[n+1],
      JCOEF_EC_MIN);
      XL2 = LL[n+1] - ((HLcur + HLnext + ROUND_LP) >> 2);
      XL1 = HLcur  + ((XL0 + XL2) >> 1);
45    HLcur = HLnext; // Updates for next iteration across row (on n)
      XL0 = XL2;
      // Horizontal sythesis of LH and HH
      SIGN_MAG_TWOS_COMPLIMENT_CONVERSION(LHnext, LH[n+1],
      JCOEF_EC_MIN);
```

```
        SIGN_MAG_TWOS_COMPLIMENT_CONVERSION(HHnext, HH[n+1],
JCOEF_EC_MIN);
        XH2 = LHnext - ((HHcur + HHnext + ROUND_LP) >> 2);
        XH1 = HHcur  + ((XH0 + XH2) >> 1);

HHcur = HHnext; // Updates for next iteration across row (on n)
        XH0 = XH2;

// Vertical synthesis of XL and XH, column2n+1
        x2[2*n+1] = RANGE_LIMIT
            (
                XL1 - ((XHprev[2*n+1] + XH1 + ROUND_LP) >> 2)
            );
        x1[2*n+1] = RANGE_LIMIT
            (
                XHprev[2*n+1] + ((XLprev[2*n+1] + x2[2*n+1]) >> 1)
            );
        // Update for next iteration down column (on m)
        XHprev[2*n+1] = (JCOEF_EC) XH1;
        XLprev[2*n+1] = x2[2*n+1];
        // Vertical synthesis of XL and XH, column2n+2
        x2[2*n+2] = RANGE_LIMIT
            (
                XL2 - ((XHprev[2*n+2] + XH2 + ROUND_LP) >> 2)
            );
        x1[2*n+2] = RANGE_LIMIT
            (
                XHprev[2*n+2] + ((XLprev[2*n+2] + x2[2*n+2]) >> 1)
            );
        // Update for next iteration down column (on m)
        XHprev[2*n+2] = (JCOEF_EC) XH2;
        XLprev[2*n+2] = x2[2*n+2];
    }

/*
     * Update the horizontal lifting memory for the next block
     * (noting L_1 = XL1 etc have been updated at the end of the above
     * loop across row elements)
     */
    horiz_itx_Lprev[2*m+2] = (JCOEF_EC) XL0;
    horiz_itx_Lprev[2*m+3] = (JCOEF_EC) XH0;
    horiz_itx_Hcur[2*m+2]  = (JCOEF_EC) HLcur;
    horiz_itx_Hcur[2*m+3]  = (JCOEF_EC) HHcur;
    is_hls_nonzero |= (XH0 | HLcur | HHcur);
}

*is_hp_horiz_lift_state_zero = (JUBYTE)(is_hls_nonzero == 0);

}
```

```
/*
 * C code implementation of the 5/3 irreversible DWT block engine using
 * zero speed-up method (implements L53_coefsamp_zerohf_iblock_engine
 * and L53_coefsamp_zerohf_iblock_engine.
 */ define ROUND_LP 2
METHODDEF_EXTERN(void)
L53_BLOCK_ENGINE_FN
(
    the_j2k_tile_decoder_ptr cinfo,
    j2k_idwt_block_engine_ptr self,
    JVOIDARRAY      output_data,
    JDIMENSION      start_row,
    JDIMENSION      start_col,
    JDIMENSION      block_height,
    JDIMENSION      block_width,
    JVOIDARRAY      vert_lift_mem,
    boolean         is_first_block_row,
    boolean         is_first_block_col,
    JVOIDARRAY      horiz_lift_mem,
    JVOIDARRAY      ip_LLbuf,
    JDIMENSION      ip_LL_line_offset,
    JCOEFARRAY_EC   HLblock,
    JCOEFARRAY_EC   LHblock,
    JCOEFARRAY_EC   HHblock,
    OP_LL_DATA_TYPE op_LL_data_type,
    boolean         is_AC_blocks_zero,
    JUBYTE          *is_hp_horiz_lift_state_zero,
    JUBYTE          *is_hp_vert_lift_state_zero,
    JFLOAT          *qstep
)
{ my_idwt_block_engine_ptr idwtbe    = (my_idwt_block_engine_ptr) self;
    int             m;
    int             n;
    JDIMENSION      op_delay = 1;
    OUTPUT_ARRAY_TYPE     op_LL_array = (OUTPUT_ARRAY_TYPE)
                    output_data + start_row + op_delay;
    OUTPUT_ROW_TYPE       x1;
    OUTPUT_ROW_TYPE       x2;

#ifdef USE_RANGE_LIMIT
    JSAMPLE         *range_limit = idwtbe->jsample_range_limit_table;
#endif

/*
```

```
     * NOTE: On a pentium int arithmetic is much faster than short int
     * arithmetic. Thus we want to do the arithmetic with int's and not
     * short ints. Thus the following variables are JINT32 (int on a pentium)
     * to force int arithmetic regardless of whether JCOEF_EC is of type
5    * int or short int.
     */

/*
      * XLi is coefficient XL(m+1,2n+i), and similarly XHi is coefficient
10    * XH(m+1,2n+i).
      */
     JINT32 XL0 = 0, XL1 = 0, XL2 = 0;
     JINT32 XH0 = 0;
     JINT32 HLcur, HHcur; // HLcur = HL[m+1,n], HHcur = HH[m+1,n].
15
     INPUT_LLBUF_ROW_TYPE LL;

// XHprev points at row m of XH, and similarly XLprev points at row m of XL
     JCOEFROW_EC XHprev = (JCOEFROW_EC)vert_lift_mem[0] + start_col;
20   JCOEFROW_EC XLprev = (JCOEFROW_EC)vert_lift_mem[1] + start_col;
     JCOEFROW_EC horiz_itx_Lprev = (JCOEFROW_EC)horiz_lift_mem[0];
     JCOEFROW_EC horiz_itx_Hcur = (JCOEFROW_EC)horiz_lift_mem[1];

/*
25    * Initiliase the vertical lifting state (XHprev only) for the first
      * iteration on m (m=-1). We need to generate XHprev[2n+1], XHprev[2n+2]
      * for n = -1,0,..block_width-1, for the vertical synthesis of row m+1 = 0
      * below. We do not need to generate XLprev, as this does not effect the
      * first row (XHprev here is row -1).As XHprev contains pre-update values
30    * we only need do the inverse row transformion (as in
      * producing XH1 and XH2, for n = -1,0,..block_width-1.)
      */
     if (is_first_block_row)
     {
35       // First update the inverse row transform values
         if (is_first_block_col)
         { // Generate horizontal lifting state to effect a symm. extension
             XH0 = 0; // we don't care here
             HHcur = 0;
40       }
         else
         { // Get horizontal lifting state from buffer
             XH0 = horiz_itx_Lprev[1]; //Highpass row is in row 2m+1
             HHcur = horiz_itx_Hcur[1];
45       }
         for (n = -1; n < (int)block_width - 1; n++)
         {
             // XH2 value
             XHprev[2*n+2] = (JCOEF_EC)((HHcur + 0 /*HH[n+1]*/ + ROUND_LP) >> 2);
```

```
            // XH1 value
            XHprev[2*n+1] = (JCOEF_EC)(HHcur  + ((XH0 + XHprev[2*n+2]) >> 1));
            // Update for next interation (on n)
            XH0 = XHprev[2*n+2];
            HHcur = 0;
          }
        }
        else
        {
          // Lifting state was intialised when the block above the current
          // block was synthesized
        }

/*
         * We set x1, an output row pointer, so that for m = -1 (overlap = 1) it points at the
         * first available output row. Lines pointed at by x2 and for x1 (m>=0) follow in order
         * from there. We also offset x1 and x2 by start_col (which equals 2lW - see the
         * calling function extract_lines method of a single level iDWT object) so that as we
         * are really generating output data points (2kH+2m+1, 2lW+2n+1) etc.
         */
        for (m = -1; m < (int) block_height-1; m++) {
          // Set input and output row pointers
          x1 = op_LL_array[2*m+1] + start_col;
          x2 = op_LL_array[2*m+2] + start_col;
          /*
           * Point LL, HL, LH and HH so that we access row kH+m+1 in each subbands,
           * and then samples lW+n+1(2) in this row.
           */
          LL = (INPUT_LLBUF_ROW_TYPE)ip_LLbuf[m+1];
          LL += ip_LL_line_offset;

//Initialise the horizontal lifting state for the first iteration across the rows (n=-1)
          if (is_first_block_col) {
            //We don't need XL0 and XH0, because we don't care about output sample -1 in this case !
            XL0 = 0;
            XH0 = 0;
            HLcur = 0; // HL[0] (Symmetric extension condition)
            HHcur = 0; // HH[0];
          }
          else {
            // "Current" row being synthesized is row m+1, hence get state from rows 2(m+1)=2m+2
            // and 2(m+1)+1 = 2m+3
            XL0 = horiz_itx_Lprev[2*m+2];
            XH0 = horiz_itx_Lprev[2*m+3];
            HLcur = horiz_itx_Hcur[2*m+2];
            HHcur = horiz_itx_Hcur[2*m+3];
          }
```

```
        for (n = -1; n < (int) block_width-1; n++)
        {
          XL2 = LL[n+1];
          XL1 = ((XL0 + XL2) >> 1);
          XL0 = XL2;
          // Horizontal sythesis of LH and HH - Nothing to do here // Vertical synthesis of XL and XH, column2n+1
          x2[2*n+1] = RANGE_LIMIT(XL1);
          x1[2*n+1] = RANGE_LIMIT(((XLprev[2*n+1] + x2[2*n+1]) >> 1));
          XLprev[2*n+1] = x2[2*n+1];
          // Vertical synthesis of XL and XH, column2n+2
          x2[2*n+2] = RANGE_LIMIT(XL2);
          x1[2*n+2] = RANGE_LIMIT(((XLprev[2*n+2] + x2[2*n+2]) >> 1));
          XLprev[2*n+2] = x2[2*n+2];
        }

/*
       * Update the horizontal lifting memory for the next block (noting L_1 = XL1 etc have been
       * updated at the end of the above loop across row elements)
       */
      horiz_itx_Lprev[2*m+2] = (JCOEF_EC) XL0;
      horiz_itx_Lprev[2*m+3] = 0;
      horiz_itx_Hcur[2*m+2] = 0;
      horiz_itx_Hcur[2*m+3] = 0;
    }

// Zero vertical (highpass) lifting state
    if (block_height > 0) {
      for (n = -1; n < (int) block_width-1; n++) {
        XHprev[2*n+1] = 0;
        XHprev[2*n+2] = 0;
      }
    }

}
```

I claim:

1. A method of inverse discrete wavelet transforming subband data in segments, wherein a plurality of different computational procedures for performing the inverse DWT may be used, and wherein a current state is maintained between a current and previous segments of subband data, the method comprising the steps of:
    testing the current state and a subset of the current segment of subband data to determine if the current segment can be inverse transformed with a reduced computational procedure;
    if the test is positive, performing the inverse DWT using the reduced computational procedure;
    otherwise performing the inverse DWT of the segment using another computational procedure.

2. A method as claimed in claim 1, wherein the current state is dependent on subband data values.

3. A method as claimed in claim 1, wherein the reduced computational procedure comprises a reduced number of computations than another computational procedure.

4. A method as claimed in claim 3, wherein the procedures are based on a lifting implementation of an inverse DWT.

5. A method as claimed in claim 4, wherein the inverse DWT is a 5/3 inverse DWT.

6. A method as claimed in claim 4, wherein the inverse DWT is a 9/7 inverse DWT.

7. A method as claimed in claim 1, wherein the inverse DWT is a two-dimensional inverse DWT.

8. A method as claimed in claim 7, wherein each segment comprises a set of two-dimensional blocks of subband data.

9. A method as claimed in claim 8, wherein each segment comprises a 1×1 block of one subband quadruple, wherein the quadruple comprises subband coefficients from each of the LL, LH, HL, and HH subbands.

10. A method as claimed in claim 8, wherein each segment comprises a 32×32 block of subband quadruples, wherein each quadruple comprises subband coefficients from each of the LL, LH, HL, and HH subbands.

11. A method as claimed in claim 8, wherein the two dimensional DWT is performed on the blocks on a block by block basis in raster scan order.

12. A method as claimed in claim 11, wherein the state is a lifting state of an inverse DWT.

13. A method as claimed in claim 12, wherein the lifting state comprises a non-AC and AC lifting state between adjacent vertical and horizontal blocks, and the subset comprises the HL, LH and HH blocks of the current segment, and wherein
    said testing step comprises:
        testing if the AC lifting state is zero and the HL, LH and HH blocks of the current segment contain all zero valued coefficients; and
        said step of performing the inverse DWT using the reduced computational procedure comprises:
            performing an inverse block-based DWT using the LL block and non-AC lifting state.

14. A method of performing a two-dimensional inverse discrete wavelet transform on blocks of LL, LH, HL and HH subband coefficients, utilizing a non-AC and AC lifting state between adjacent vertical and horizontal blocks, the method comprising the step of:
    generating a current output block of pixels corresponding to a current set of LL, HL, LH, and HH blocks, wherein if the HL, LH and HH blocks contain all zero valued coefficients, and the AC lifting state corresponding to the current block of pixels is zero, performing an inverse block-based DWT using the LL block and non-AC lifting state to generate the current block of pixels.

15. A method of two-dimensional inverse discrete wavelet transforming subband data, wherein the subband data comprises a plurality of blocks of subband data and the blocks each comprise at least one quadruplet of LL, HL, LH and HH subband coefficients, and wherein the method utilizes a non-AC and AC lifting state between adjacent vertical and horizontal blocks, the method comprising the step of:
    generating a current output block of pixels corresponding to a current set of LL, HL, LH, and HH blocks, wherein if the HL, LH and HH blocks contain all zero valued coefficients, and the AC lifting state corresponding to the current block of pixels is zero, performing an inverse block-based DWT using the LL block and a non-AC lifting state to generate the current block of pixels.

16. An apparatus for inverse discrete wavelet transforming subband data in segments, wherein a plurality of different computational procedures for performing the inverse DWT may be used, and wherein a current state is maintained between a current and previous segments of subband data, said apparatus comprising:
    means for testing the current state and a subset of the current segment of subband data to determine if the current segment can be inverse transformed with a reduced computational procedure;
    means for performing, if the test is positive, the inverse DWT using the reduced computational procedure; and
    means for performing, if the test is negative, the inverse DWT of the segment using another computational procedure.

17. Apparatus as claimed in claim 16, wherein the current state is dependent on subband data values.

18. Apparatus as claimed in claim 16, wherein the reduced computational procedure comprises a reduced number of computations than another computational procedure.

19. Apparatus as claimed in claim 18, wherein the procedures are based on a lifting implementation of an inverse DWT.

20. Apparatus as claimed in claim 19, wherein the inverse DWT is a 5/3 inverse DWT.

21. Apparatus as claimed in claim 19, wherein the inverse DWT is a 9/7 inverse DWT.

22. Apparatus as claimed in claim 16, wherein the inverse DWT is a two-dimensional inverse DWT.

23. Apparatus as claimed in claim 22, wherein each segment comprises a set of two-dimensional blocks of the subband data.

24. Apparatus as claimed in claim 23, wherein each segment comprises a 1×1 block of one subband quadruple, wherein the quadruple comprises subband coefficients from each of the LL, LH, HL, and HH subbands.

25. Apparatus as claimed in claim 23, wherein each segment comprises a 32×32 block of subband quadruples, wherein each quadruple comprises subband coefficients from each of the LL, LH, HL, and HH subbands.

26. Apparatus as claimed in claim 23, wherein the two dimensional DWT is performed on the blocks on a block by block basis in raster scan order.

27. Apparatus as claimed in claim 26, wherein the state is a lifting state of an inverse DWT.

28. Apparatus as claimed in claim 27, wherein the lifting state comprises a non-AC and AC lifting state between adjacent vertical and horizontal blocks, and the subset comprises the HL, LH and HH blocks of the current segment, and wherein
   said testing means comprises:
      means for testing if the AC lifting state is zero and the HL, LH and HH blocks of the current segment contain all zero valued coefficients; and
      said means for performing the inverse DWT using the reduced computational procedure comprises:
      means for performing an inverse block-based DWT using the LL block and non-AC lifting state.

29. An apparatus for performing a two-dimensional inverse discrete wavelet transform on blocks of LL, LH, HL and HH subband coefficients, utilizing a non-AC and AC lifting state between adjacent vertical and horizontal blocks, said apparatus comprising:
   means for testing whether the HL, LH and HH blocks contain all zero valued coefficients and the AC lifting state corresponding to a current block of pixels is zero; and
   means for performing, if said means for testing returns in the affirmative, an inverse block-based DWT using the LL block and non-AC lifting state to generate the current block of pixels.

30. An apparatus for two-dimensional inverse discrete wavelet transforming subband data, wherein the subband data comprises a plurality of blocks of subband data and the blocks each comprise at least one quadruplet of LL, HL, LH and HH subband coefficients, the apparatus utilizing a non-AC and AC lifting state between adjacent vertical and horizontal blocks, the apparatus comprising:
   means for testing whether the HL, LH and HH blocks contain all zero valued coefficients and the AC lifting state corresponding to a current block of pixels is zero; and
   means for performing, if said means for testing returns in the affirmative, an inverse block-based DWT using the LL block and a non-AC lifting state to generate the current block of pixels.

31. A computer program stored in a computer-readable storage medium which, when executed, performs a method for inverse discrete wavelet transforming subband data in segments, wherein a plurality of different computational procedures for performing the inverse DWT may be used, and wherein a current state is maintained between current and previous segments of subband data, the program comprising:
   code for testing the current state and a subset of the current segment of subband data to determine if the current segment can be inverse transformed with a reduced computational procedure;
   code for performing, if the test is positive, the inverse DWT using the reduced computational procedure; and
   code for performing, if the test is negative, the inverse DWT of the segment using another computational procedure.

32. A computer program as claimed in claim 31, wherein the current state is dependent on subband data values.

33. A computer program as claimed in claim 31, wherein the reduced computational procedure comprises a reduced number of computations than another computational procedure.

34. A computer program as claimed in claim 33, wherein the procedures are based on a lifting implementation of an inverse DWT.

35. A computer program as claimed in claim 34, wherein the inverse DWT is a 5/3 inverse DWT.

36. A computer program as claimed in claim 34, wherein the inverse DWT is a 9/7 inverse DWT.

37. A computer program as claimed in claim 31, wherein the inverse DWT is a two-dimensional inverse DWT.

38. A computer program as claimed in claim 37, wherein each segment comprises a set of two-dimensional blocks of the subband data.

39. A computer program as claimed in claim 38, wherein each segment comprises a 1×1 block of one subband quadruple, wherein the quadruple comprises subband coefficients from each of the LL, LH, HL, and HH subbands.

40. A computer program as claimed in claim 38, wherein each segment comprises a 32×32 block of subband quadruples, wherein each quadruple comprises subband coefficients from each of the LL, LH, HL, and HH subbands.

41. A computer program as claimed in claim 38, wherein the two dimensional DWT is performed on the blocks on a block by block basis in raster scan order.

42. A computer program as claimed in claim 41, wherein the state is a lifting state of an inverse DWT.

43. A computer program as claimed in claim 42, wherein the lifting state comprises a non-AC and AC lifting state between adjacent vertical and horizontal blocks, and the subset comprises the HL, LH and HH blocks of the current segment, and wherein
   said testing means comprises:
      means for testing if the AC lifting state is zero and the HL, LH and HH blocks of the current segment contain all zero valued coefficients; and
      said means for performing the inverse DWT using the reduced computational procedure comprises:
      means for performing an inverse block-based DWT using the LL block and non-AC lifting state.

44. A computer program stored in a computer-readable storage medium which, when executed, performs a method for performing a two-dimensional inverse discrete wavelet transform on blocks of LL, LH, HL and HH subband coefficients, utilizing a non-AC and AC lifting state between adjacent vertical and horizontal blocks, the computer program comprising:
   code for testing whether the HL, LH and HH blocks contain all zero valued coefficients and the AC lifting state corresponding to a current block of pixels is zero; and
   code for performing, if said code for testing returns in the affirmative, an inverse block-based DWT using the LL block and non-AC lifting state to generate the current block of pixels.

45. A computer program stored in a computer-readable storage medium which, when executed, performs a method for two-dimensional inverse discrete wavelet transforming subband data, wherein the subband data comprises a plurality of blocks of subband data and the blocks each comprise at least one quadruplet of LL, HL, LH and HH subband coefficients, the apparatus utilizing a non-AC and AC lifting state between adjacent vertical and horizontal blocks, the computer program comprising:
   code for testing whether the HL, LH and HH blocks contain all zero valued coefficients and the AC lifting state corresponding to a current block of pixels is zero; and code for performing, if said code for testing returns in the affirmative, an inverse block-based DWT using the LL block and a non-AC lifting state to generate the current block of pixels.

46. A method according to claim 1, wherein the inverse DWT comprises a plurality of substeps and the reduced computation procedure comprises skipping at least one of the substeps for which an output of the substep is zero if a high-frequency component of the subset of subband data and the current state is zero.

* * * * *

UNITED STATES PATENT AND TRADEMARK OFFICE
CERTIFICATE OF CORRECTION

PATENT NO. : 7,072,517 B2
APPLICATION NO. : 10/201684
DATED : July 4, 2006
INVENTOR(S) : James Philip Andrew It is certified that error appears in the above-identified patent and that said Letters Patent is hereby corrected as shown below:

COLUMN 1

Line 33, "(ie." should read --(i.e.--.

COLUMN 2

Line 14, "a inverting" should read --inverting--; and
Line 44, "quantised" should read --quantized--.

COLUMN 3

Line 26, "(ie a column" should read --(i.e. a column)--; and
Line 41, "(ISO/IEC 15-1:2000)," should read --(ISO/IEC 15444-1:2000),--.

COLUMN 4

Line 6, "procedure;" should read --procedure; and--.

COLUMN 5

Line 12, "provided" should read --provided a--; and
Line 64, "row" should read --rows--.

COLUMN 6

Line 19, "engine" should read --engine.--.

COLUMN 8

Line 9, "and S'$_n$," should read -- and S'$_n$--;
Line 14, "ie the" should read --i.e. the--;
Line 58, "(eg." should read --(e.g.--;
Line 62, "(eg." should read --(e.g.--; and
Line 64, "(eg." should read --(e.g.--.

COLUMN 9

Line 26, "implmentation." should read --implementation.--;
Line 44, "intennediate" should read --intermediate--; and
Line 46, "IDWT" should read --iDWT--.

UNITED STATES PATENT AND TRADEMARK OFFICE
CERTIFICATE OF CORRECTION

PATENT NO. : 7,072,517 B2
APPLICATION NO. : 10/201684
DATED : July 4, 2006
INVENTOR(S) : James Philip Andrew It is certified that error appears in the above-identified patent and that said Letters Patent is hereby corrected as shown below:

COLUMN 10

Line 12, "transform" should read --transforms--; and "row" should read --row of--;
Line 18, "(ie from" should read --(i.e. from--; and
Line 39, "HC sub-" should read --$H^c$ sub- --.

COLUMN 11

Line 4, "reconstruct" should read --reconstructs--;
Line 6, "of" should be deleted; and
Line 44, "that" should be deleted--.

COLUMN 12

Line 2, "ccordance" should read --accordance--;
Line 29, "1])>>2);" should read --1]>>1);--; and
Line 36, "2)>>2)" should read --2)>>1);--.

COLUMN 13

Line 38, "(ie." should read --(i.e.--; and
Line 58, "(ie." should read --(i.e.--.

COLUMN 14

Line 13, "has" should be deleted;
Line 24, "the LL1" should read --the LLj--;
Line 27, "length" (second occurrence) should read --length of--;
Line 52, "levelj," should read --level j,--;
Line 66, "are," should read --are--.

COLUMN 15

Line 37, "j=j)," should read --j=J),--;
Line 57, "ie" should read --i.e.--; and "Hhcur," should read --HHcur,--;
Line 63, "ie Xlprev" should read --i.e. XLprev--; and, "Xhprev" should read --XHprev--.

UNITED STATES PATENT AND TRADEMARK OFFICE
CERTIFICATE OF CORRECTION

PATENT NO.        : 7,072,517 B2
APPLICATION NO.   : 10/201684
DATED             : July 4, 2006
INVENTOR(S)       : James Philip Andrew It is certified that error appears in the above-identified patent and that said Letters Patent is hereby corrected as shown below:

COLUMN 17

Line 16, "practised" should read --practiced--.

Signed and Sealed this

Twelfth Day of August, 2008

JON W. DUDAS
*Director of the United States Patent and Trademark Office*